(12) United States Patent
Yanagisawa et al.

(10) Patent No.: US 7,821,899 B2
(45) Date of Patent: Oct. 26, 2010

(54) OPTICAL PICKUP DEVICE

(75) Inventors: Takuma Yanagisawa, Tsurugashima (JP); Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 460 days.

(21) Appl. No.: 11/996,430

(22) PCT Filed: Jul. 3, 2006

(86) PCT No.: PCT/JP2006/313244
§ 371 (c)(1),
(2), (4) Date: Jan. 22, 2008

(87) PCT Pub. No.: WO2007/010737
PCT Pub. Date: Jan. 25, 2007

(65) Prior Publication Data
US 2009/0129235 A1    May 21, 2009

(30) Foreign Application Priority Data
Jul. 22, 2005    (JP)    ............... 2005-213138

(51) Int. Cl.
*G11B 7/00*    (2006.01)
(52) U.S. Cl. .............. 369/112.03; 369/112.06; 369/112.07; 369/112.02
(58) Field of Classification Search ............ 369/112.03, 369/112.06, 112.07
See application file for complete search history.

(56) References Cited
U.S. PATENT DOCUMENTS
7,197,004 B2 *  3/2007  Horiyama .............. 369/112.03
2004/0196771 A1 *  10/2004  Shimano et al. .......... 369/112.03
2005/0276206 A1 *  12/2005  Katayama .............. 369/112.03

FOREIGN PATENT DOCUMENTS
| JP | 11-296875 | 10/1999 |
|----|-----------|---------|
| JP | 2001-250250 | 9/2001 |
| JP | 2003-162831 | 6/2003 |
| JP | 2004-86957 | 3/2004 |
| JP | 2004-95077 | 3/2004 |
| JP | 2005-100550 | 4/2005 |

* cited by examiner

*Primary Examiner*—Lixi Chow
(74) *Attorney, Agent, or Firm*—Drinker Biddle & Reath LLP

(57) ABSTRACT

The present invention provides an optical pickup device requiring no position adjustment of a diffraction grating at the time of assembling the optical pickup device, and capable of suppressing fluctuations in a differential push-pull signal amplitude and cancelling a push-pull offset.

An optical pickup device 200 of an embodiment of the present invention has a diffraction grating 230 of a special shape including predetermined grooves and two kinds of lattice grooves arranged at a pitch determined on the basis of a pitch of grooves formed in the surface of an optical disk 50, numerical aperture, wavelength of a light beam, and effective diameter of the light beam applied on the optical disk 50.

To suppress push-pull signals generated in the ± first-order diffraction rays, reflection rays from the optical disk 50 of a zeroth-order diffraction ray and ± first-order diffraction rays are detected, and signals corresponding to light reception results are output to a reproduction unit 150, a control unit 130, and an actuator servo circuit 140.

4 Claims, 18 Drawing Sheets

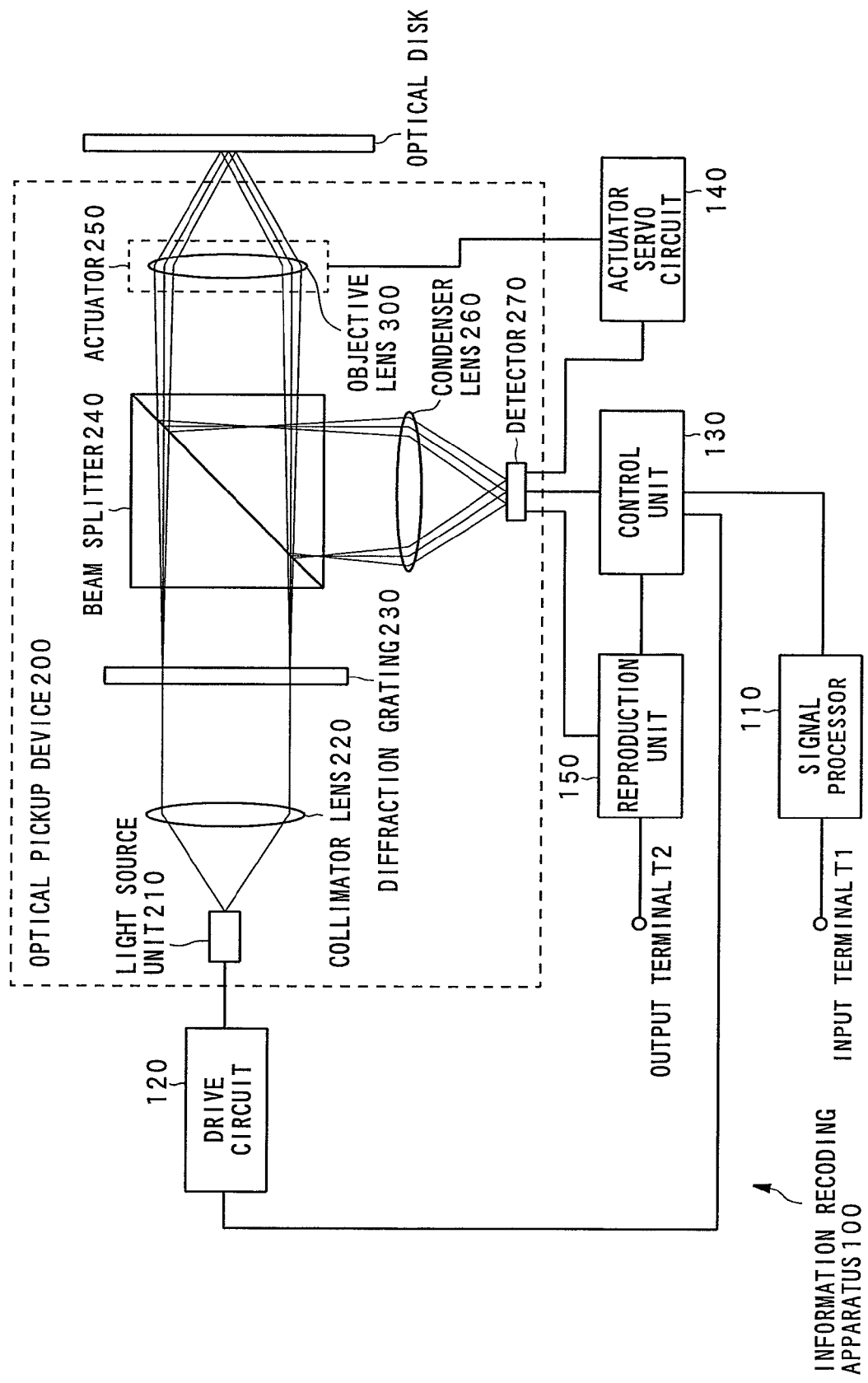

FIG. 9
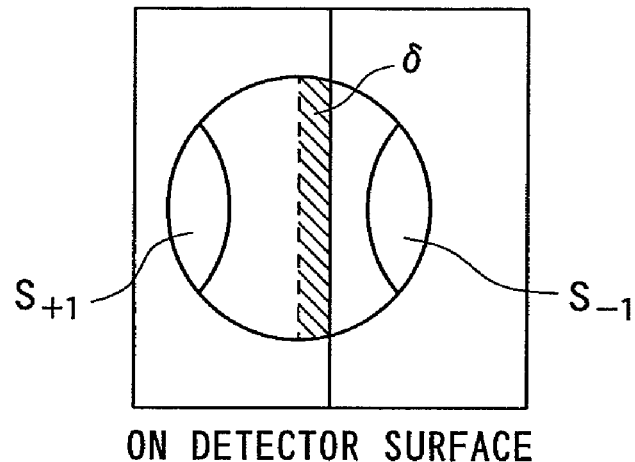
ON DETECTOR SURFACE
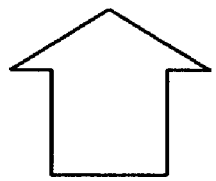
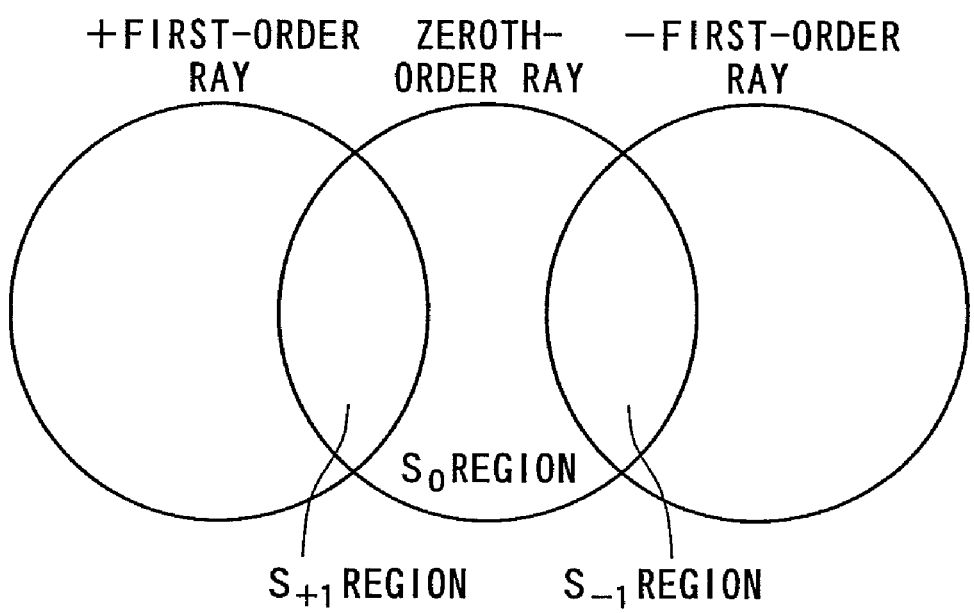
ON OBJECTIVE LENS SURFACE

OPTICAL PICKUP DEVICE

TECHNICAL FIELD

The present invention relates to the technical field of an optical pickup device used for recording/reproducing information to/from an optical recording medium such as an optical disk.

BACKGROUND ART

In recent years, an optical disk such as a CD (Compact Disc) or DVD (Digital Versatile Disc) is being used more and more in many fields of audio, video, computers, and the like since it can record a large amount of information signals at high density. In particular, recently, the amount of data handled in a computer or the like such as moving picture information is dramatically increasing and, accordingly, the capacity of an optical disk is being increased by reducing the size of a recording pit and a track pitch.

In an optical recording medium such as an optical disk, at the time of reproducing signals recorded on the optical recording medium, a light beam has to be accurately applied to the track. It is therefore necessary to perform tracking control of making a light spot follow the track on which the signal is recorded.

Hitherto, a differential push pull (DPP) method is known as a representative detecting method. In the method, at the time of performing the tracking control, to cancel an offset of a tracking error signal indicative of an error in tracking which occurs in movement in the radial direction of the optical recording medium, the tracking error is detected.

In the DPP method, a light beam applied to an optical disk is split to a main beam and two sub-beams. The light beam is applied to an optical disk while shifting each of the sub-beams in the radial direction of the optical disk only by a "½" track pitch of a track in which the main beam is condensed. Reflection light from the optical disk is detected by a half-split detector. By using push pull signals including the sub-beams output from the half-split detector, a tracking error signal in which a push-pull offset is cancelled is detected. On the basis of the detected tracking error signal, tracking control is performed.

In particular, recently, as a method of suppressing fluctuations in the amplitude of a differential push-pull signal due to changes in the positions in the radial direction of the main beam and the sub-beams applied onto an optical disk, the following method is used. In the method, a diffracting grating is divided into four quadrants (regions) around the optical axis of a light beam as a center. Only in combinations of diagonal quadrants such as the first and third quadrants, lattice grooves are shifted only by a predetermined amount. Using the diffraction grating, a zeroth-order diffraction ray (that is, a main beam) and ± first-order diffraction rays (that is, sub-beams) to be applied to an optical disk are emitted. On the basis of reflection light of the emitted diffraction rays, a tracking error signal is detected.

The DPP method using the special diffraction grating gives effects similar to those of a normal diffraction grating to the zeroth-order diffraction ray as the main beam emitted from the light source and, on the other hand, produces effects, to the ± first-order diffraction rays, that a phase shift occurs due to a delay of the phase of the wavefront in a quadrant in which the lattice grooves are shifted from that of the wavefront in another quadrant.

Therefore, in the DPP method using the special diffraction grating, as described above, when the diffraction grating is divided into four quadrants (regions) around the optical axis of a light beam as a center and the lattice grooves are shifted only by a predetermined amount only in combinations of diagonal quadrants such as first and third quadrants, a push-pull signal generated in the quadrants (first and second quadrants) in the upper half of the sub-beam of ± first-order rays and a push-pull signal generated in the quadrants (third and fourth quadrants) in the lower half cancel out each other. In the whole light beam, fluctuations in the push-pull signal amplitude can be suppressed and a push-pull offset can be cancelled (for example, patent document 1).

Patent document 1: Japanese Patent Application Laid-Open No. 2001-250250

DISCLOSURE OF THE INVENTION

Problem to be Solved by the Invention

However, in the DPP method using the special diffraction grating as described above, in the diffraction grating, the regions in which a phase difference is given to the ± first-order diffraction rays are diagonal regions with respect to the center of a light beam passing the diffraction grating or regions symmetrical with respect to the center line in the track direction of a recording medium. Consequently, at the time of assembling an optical pickup device, adjustment of the position of the diffraction grating such as adjustment in the track direction or the radial direction of an optical recording medium has to be performed with high precision.

As an example of the subject, the present invention provides an optical pickup device requiring no position adjustment of a diffraction grating at the time of assembling the optical pickup device and capable of suppressing fluctuations in a differential push-pull signal amplitude and cancelling a push-pull offset.

Means for Solving Problem

In order to solve the above problem, the invention according to claim 1 relates to an optical pickup device for emitting a light beam to an optical recording medium to perform at least one of reading of data recorded on the optical recording medium and recording of data to the optical recording medium, comprising:

a light source for emitting a light beam at the time of performing at least one of reading of data recorded on the optical recording medium and recording of data to the optical recording medium;

a diffraction grating for diffracting the light beam emitted from the light source to apply at least a zeroth-order diffraction ray, a + first-order diffraction ray, and a – first-order diffraction ray to the optical recording medium;

light condensing means for condensing the diffraction rays to the optical recording medium;

light receiving means for receiving the diffraction rays reflected from the optical recording medium and outputting light reception signals; and control means for controlling a position on the optical recording medium of the light condensing means on the basis of the light reception signals, wherein in the diffraction grating, when pitch of grooves formed in a surface of the optical recording medium in the radial direction of the optical recording medium is GP, effective diameter of a light beam in the light condensing means is D, wavelength of the light beam is $\lambda$, numerical aperture is NA, and n is a natural number, first and second lattice grooves are arranged at the pitch P satisfying the following equation in a direction perpendicular to a track direction in which data is recorded in the optical recording medium, $$P = \frac{\lambda \cdot D}{(2n+1) \cdot GP \cdot NA} \quad \text{(Equation 1)}$$

each of the first and second lattice grooves has grooves formed in predetermined cycles in the track direction in which data is recorded on the optical recording medium, and the grooves in the track direction of one of the first and second lattice grooves are shifted from the cycles of grooves in the other lattice groove by ½.

In order to solve the above problem, the invention according to claim 2 relates to an optical pickup device for emitting a light beam to an optical recording medium to perform at least one of reading of data recorded on the optical recording medium and recording of data to the optical recording medium, comprising:

a light source for emitting a light beam at the time of performing at least one of reading of data recorded on the optical recording medium and recording of data to the optical recording medium;

a diffraction grating for diffracting the light beam emitted from the light source to apply at least a zeroth-order diffraction ray, a + first-order diffraction ray, and a − first-order diffraction ray to the optical recording medium;

light condensing means for condensing the diffraction rays to the optical recording medium;

light receiving means for receiving the diffraction rays reflected from the optical recording medium and outputting light reception signals; and control means for controlling a position on the optical recording medium of the light condensing means on the basis of the light reception signals, wherein in the diffraction grating, when pitch of grooves formed in a surface of the optical recording medium in the radial direction of the optical recording medium is GP, effective diameter of a light beam in the light condensing means is D, wavelength of the light beam is λ, numerical aperture is NA, and n is a natural number, first and second lattice grooves are arranged at the pitch P satisfying the following equation in a direction perpendicular to a track direction in which data is recorded in the optical recording medium, $$P = \frac{\lambda \cdot D}{(4n+2) \cdot GP \cdot NA} \quad \text{(Equation 2)}$$

each of the first and second lattice grooves has grooves formed in predetermined cycles in the track direction in which data is recorded on the optical recording medium, and the grooves in the track direction of one of the first and second lattice grooves are shifted from the cycles of grooves of the other lattice groove by ¼.

BRIEF DESCRIPTION OF THE DRAWINGS

FIG. 1 is a block diagram showing the configuration of an embodiment of an information recording/reproducing apparatus according to the present invention.

FIG. 9 is a diagram (II) for explaining the arrangement pitch P at which the first and second lattice grooves in the diffraction grating of the embodiment are arranged.

DESCRIPTION OF REFERENCE NUMERALS

Figure 2A:
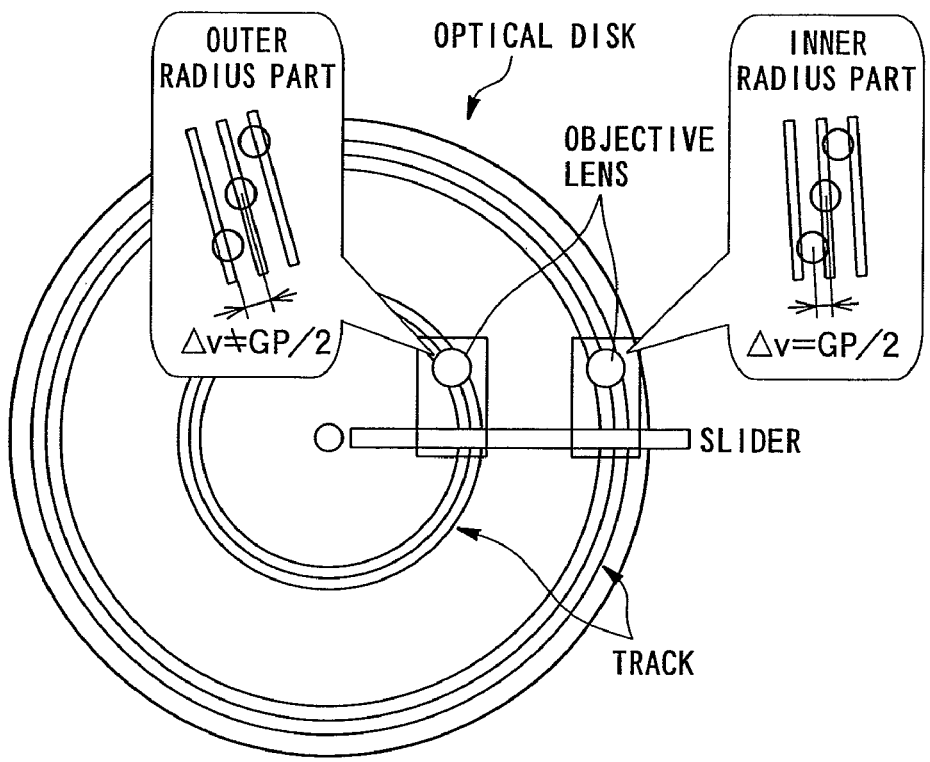
FIGS. 2A and 2B are diagrams for explaining the principle of a diffraction grating 230 in the embodiment.

100 information recording apparatus
110 signal processor
120 drive circuit
130 control unit
140 actuator servo circuit
150 reproduction unit
200 optical pickup device
210 light source unit
220 collimator lens
230 diffraction grating 231 first lattice groove
232 second lattice groove
240 beam splitter
250 actuator
260 condenser lens
270 detector
300 objective lens

BEST MODE FOR CARRYING OUT THE INVENTION

Preferred embodiments of the present invention will now be described with reference to the drawings.

The following embodiments relate to the case of applying an optical pickup device of the present invention as an optical pickup device for recording/reproducing information to/from an optical recording medium such as a CD, DVD, or BD (Blu-ray Disc) (hereinbelow, called "optical disk").

First, a schematic configuration of an information recording/reproducing apparatus of the embodiment will be described with reference to FIG. 1. FIG. 1 is a block diagram showing the configuration of an information recording/reproducing apparatus of the embodiment.

An information recording apparatus 100 of the embodiment has: a signal processor 110 for performing a predetermined process on an input signal; an optical pickup device 200 for irradiating an optical disk 50 with a light beam on the basis of the processed signal, detecting reflection light of the light beam, and outputting a light reception signal; a drive circuit 120 for driving the optical pickup device 200; a control unit 130 for controlling the drive circuit 120; an actuator servo circuit 140 for controlling an actuator 250 which will be described later in the optical pickup device 200; and a reproduction unit 150 for reproducing the light reception signal output from the optical pickup device 200. The information recording apparatus 100 records/reproduces a predetermined signal to/from the optical disk 50.

To the signal processor 110, predetermined data is input from the outside via an input terminal T1. The signal processor 110 performs a predetermined signal process on the input data and outputs the data underwent the signal process to the control unit 130.

For example, the signal processor 110 of the embodiment compresses input video and sound data in accordance with a predetermined compression method such as MPEG (Moving Picture Experts Group) and outputs the compressed data to the control unit 130.

The drive circuit 120 is mainly constructed by an amplification circuit. The drive circuit 120 amplifies a drive signal input from the control unit 130 and supplies the amplified drive signal to the optical pickup device 200. The drive circuit 120 has a predetermined amplification factor. Under control of the control unit 130, in the case of recording data to the optical disk 50, the drive circuit 120 outputs a light beam at a recording power from the optical pickup device 200. In the case of reproducing data recorded on the optical disk 50, the drive circuit 120 outputs a light beam at a reproduction power from the optical pickup device 200.

The "recording power" denotes an energy amount causing a phase change or a dye color change in the optical disk 50 of the phase change type such as a DVD-RW (DVD-ReWritable) and the optical disk 50 of the dye color change type such as a DVD-R (DVD-Recordable). The "reproduction power" denotes an energy amount which does not cause a change such as a dye color change in the optical disk 50.

The control unit 130 is mainly constructed by a central processing unit (hereinbelow, called CPU) and controls the components of the information recording/reproducing apparatus. In the case of recording data to the optical disk 50, the control unit 130 of the embodiment outputs a drive signal for recording corresponding to data input from the signal processor 110 and controls the amplification factor of the drive circuit 120 so that the drive circuit 120 outputs a light beam of predetermined recording power. In the case of reproducing data recorded on the optical disk 50, the control unit 130 outputs a drive signal for reproduction to the drive circuit 120, and controls the amplification factor of the drive circuit 120 so that the drive circuit 120 outputs a light beam of predetermined reproduction power.

The control unit 130 of the embodiment performs various controls on a not-shown rotation drive circuit 120 such as a rotation control on the optical disk 50 on the basis of the light reception signal output from the optical pickup device 200.

The optical pickup device 200 is used to emit a light beam to the optical disk 50 on the basis of the control signal supplied from the drive circuit 120 and read/write data from/to the optical disk 50. The optical pickup device 200 of the embodiment irradiates the optical disk 50 with a zeroth-order diffraction ray and ± first-order diffraction rays obtained by diffracting the light beam and, at the time of irradiating the optical disk 50 with the diffraction rays, condenses the rays via an objective lens 300 assembled in the actuator 250. The optical pickup device 200 receives the diffraction rays (hereinbelow, also called "diffraction ray") applied to and reflected by the optical disk 50 and outputs, as light reception signals, signals corresponding to the light reception results to the reproduction unit 150, the control unit 130, and the actuator servo circuit 140.

In particular, the optical pickup device 200 of the embodiment has a diffraction grating 230 of a special shape including predetermined grooves and two kinds of lattice grooves arranged at a pitch determined on the basis of a pitch of grooves formed in the surface of the optical disk 50, numerical aperture of the objective lens 300, wavelength of a light beam, and effective diameter of the light beam applied on the optical disk 50. Each of the ± first-order diffraction rays is constructed so as to suppress the push-pull signal amplitude. The optical pickup device 200 detects reflection light from the optical disk 50 of the zeroth-order diffraction ray and the ± first-order diffraction rays, and outputs signals corresponding to light reception results to the reproduction unit 150, the control unit 130, and the actuator servo circuit 140 so as to suppress fluctuations in the differential push-pull signal amplitude even if the distances in the radial direction of the zeroth-order diffraction ray and the ± first-order diffraction rays on the optical disk 50 change.

The details of the configuration and operation of the optical pickup device 200 in the embodiment will be described later.

The reproduction unit 150 has, for example, an adder and an amplifier circuit. The reproduction unit 150 generates a reproduction RF signal on the basis of the light reception signal as a signal output from the optical pickup device 200, performs a predetermined signal process on the reproduction RF signal and, after that, outputs the processed signal to an output terminal T2.

The actuator servo circuit 140 is constructed by an arithmetic circuit, generates a correction signal, concretely, a tracking error signal and a focus error signal on the basis of the light reception signal output from the optical pickup device 200, and performs a movable control on the objective lens 300 for condensing a light beam onto the optical disk 50 via the actuator 250.

In particular, the actuator servo circuit 140 of the embodiment performs a movable control of the actuator 250 by using the DPP method. The actuator servo circuit 140 generates a DPP signal on the basis of light reception signals of the zeroth-order diffraction ray and the ± first-order diffraction rays of the light beam, and outputs the generated DPP signal as a tracking error signal to the actuator 250.

In the embodiment, as will be described later, the optical pickup device 200 receives the diffraction rays by light receiving elements divided by partition lines parallel with the track direction of the optical disk 50. Consequently, the actuator servo circuit 140 generates differential signals $PP_{sub1}$, $PP_{sub2}$, and $PP_{main}$ of output signals of detectors 270 divided in the diffraction rays, adds the differential signals $PP_{sub1}$, $PP_{sub2}$ in the ± first-order diffraction rays, multiplies the resultant signal with a predetermined value "G", and subtracting the resultant signal from the differential signal of the zeroth-order diffraction ray, thereby generating a DPP signal.

$$DPP = PP_{main} - G(PP_{sub1} + PP_{sub2}) \quad \text{(Equation 3)}$$

"G" denotes a coefficient for correcting the difference in the light amounts of the zeroth-order diffraction ray and the ± first-order diffraction rays and is a value for normalizing the light amounts by the light amount of the zeroth-order diffraction light.

Similarly, the configuration and operation of the optical pickup device 200 of the embodiment will be described with reference to FIG. 1.

The optical pickup device 200 of the embodiment has: a light source unit 210 for emitting a light beam; a collimator lens 220 for converting a light beam emitted from the light source unit 210 into almost parallel rays; a diffraction grating 230 for passing the light beam, thereby outputting a diffraction ray; a beam splitter 240 for passing the diffraction rays output from the diffraction grating 230 and reflecting the reflection light from the optical disk 50; the actuator 250 in which the objective lens 300 for condensing the diffraction rays to the optical disk 50 is assembled; a condenser lens 260 for condensing the reflection light from the optical disk 50; and the detector 270 detecting each of the reflection light condensed by the condenser lens 260 in a half-split manner.

For example, the light source unit 210 of the embodiment corresponds to a light source of the present invention, and the diffraction grating 230 corresponds to the diffraction grating 230 of the invention. For example, the objective lens 300 of the embodiment corresponds to the light condensing means of the invention, and the actuator 250 corresponds to the control means of the invention. Further, for example, the detector 270 of the embodiment corresponds to the light receiving means of the invention.

The light source unit 210 is constructed by a semiconductor laser circuit and emits a light beam having a predetermined power to the optical disk 50 on the basis of the signal supplied from the drive circuit 120.

The collimator lens 220 is provided in an optical path of the light beam emitted from the light source unit 210 to the optical disk 50, converts the light beam emitted from the light source unit 210 to almost parallel rays, and makes the parallel rays enter the diffraction grating 230.

The diffraction grating 230 is provided in the optical path of the light beam emitted from the light source unit 210 to the optical disk 50. To the diffraction grating 230, the light beam converted to almost parallel rays by the collimator lens 220 is applied. The diffraction grating 230 passes the incident light beam, thereby diffracting the light beam into at least a zeroth-order diffraction ray, a + first-order diffraction ray, and a − first-order diffraction ray.

Particularly, the diffraction grating 230 of the embodiment has, as described above, predetermined grooves and two kinds of lattice grooves arranged at a pitch determined on the basis of a pitch of grooves formed in the surface of the optical disk 50, numerical aperture of the objective lens 300, wavelength of a light beam, and effective diameter of the light beam applied on the optical disk 50. A push-pull signal is generated by the zeroth-order diffraction ray. While transmitting the zeroth-order diffraction ray, the phase of each of the ± first-order diffraction rays is changed so as to suppress the push-pull signal amplitude by the ± first-order diffraction rays. The details of the configuration of the diffraction grating 230 in the embodiment will be described later.

The beam splitter 240 is provided in the optical path of the light beam emitted from the light source unit 210 to the optical disk 50. The beam splitter 240 transmits the diffraction rays output from the diffraction grating 230 so that the diffraction rays are incident on the objective lens 300, and reflects the reflection light from the optical disk 50. The reflected reflection light is received by the detector 270 via the condenser lens 260.

The actuator 250 is provided in the optical path of the light beam emitted from the light source unit 210 to the optical disk 50. The actuator 250 has: the objective lens 300 for condensing the diffraction rays passed through the beam splitter 240 onto the optical disk 50 and making the diffraction rays reflected from the optical disk 50 as reflection light incident on the beam splitter 240; a not-shown lens holder for holding the objective lens 300; and a not-shown mechanism unit for controlling the position in the optical disk 50 of the objective lens 300 via the lens holder on the basis of the signal output from the actuator servo circuit 140.

The condenser lens 260 is provided in the optical path of the reflection light from the optical disk 50 and condenses the reflection light reflected by the beam splitter 240 to the detector 270.

The detector 270 receives each of the diffraction rays reflected from the optical disk 50 via the condenser lens 260 in a half-split manner and outputs the light reception signals according to the light reception results to the reproduction unit 150, the control unit 130, and the actuator servo circuit 140.

Particularly, the detector 270 of the embodiment is constructed by a plurality of light receiving elements having the form of photo diodes. The detector 270 has: a first light receiving element for receiving the zeroth-order diffraction ray, which is halved by a partition line parallel with the track direction of the optical disk 50; and second and third light receiving elements for receiving the + first-order diffraction ray and the − first-order diffraction ray, which is halved by a partition line parallel with the track direction of the optical disk 50. On the basis of results of reception of the diffraction rays in the light receiving elements, the detector 270 outputs the light reception signals to the actuator servo circuit 140.

Figure 2B:
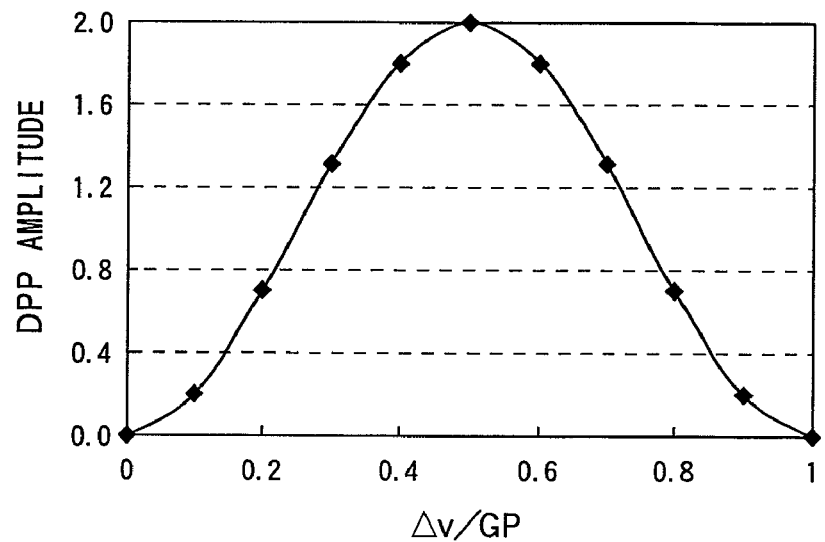
Figure 3:
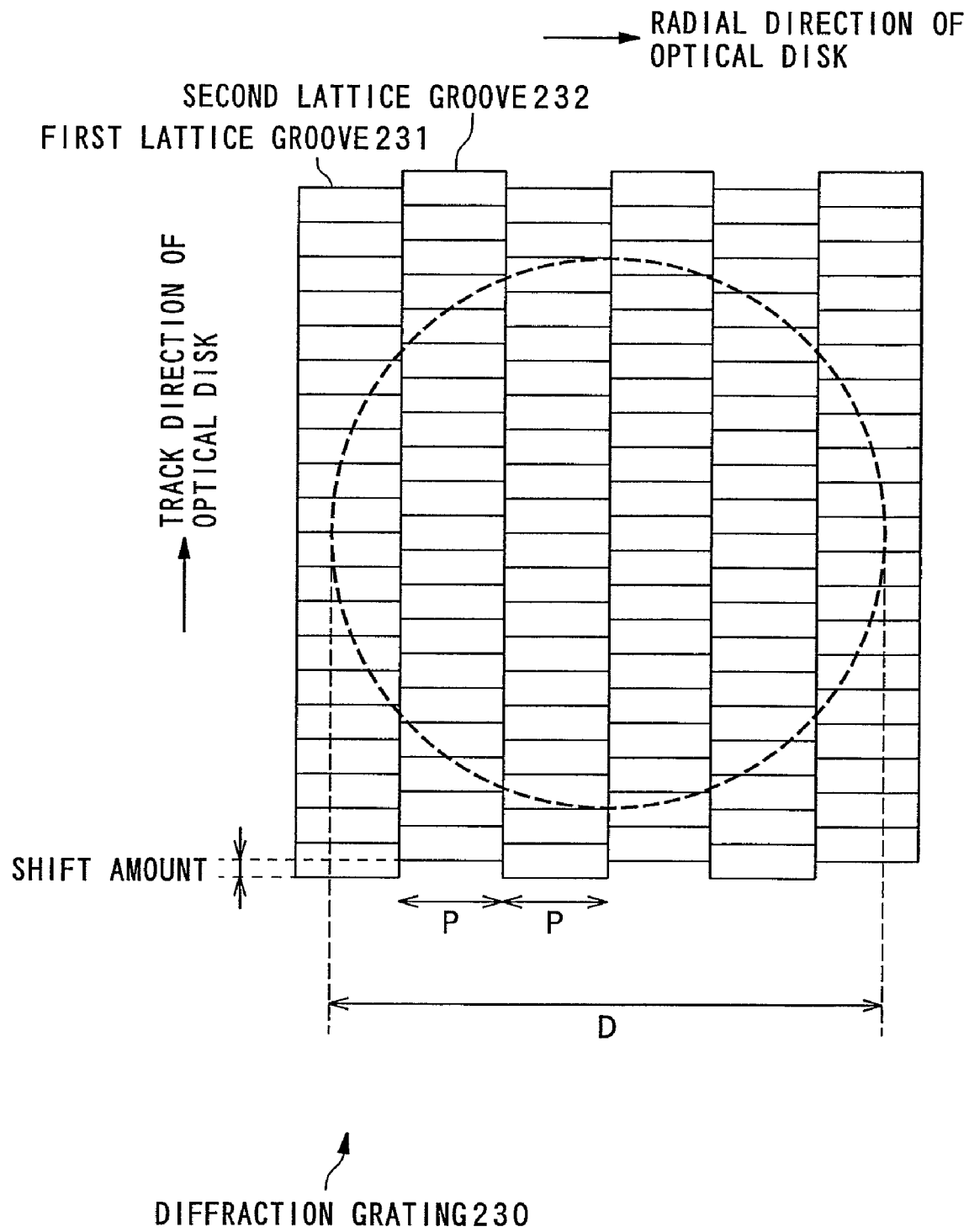
FIG. 3 is a plan view showing the configuration of the diffraction grating 230 in the embodiment.

The configuration of the diffraction grating 230 in the embodiment will be described with reference to FIGS. 2A and 2B, and 3. FIGS. 2A and 2B are diagrams for explaining the principle of the diffraction grating 230 in the embodiment. FIG. 3 is a plan view showing the configuration of the diffraction grating 230 in the embodiment.

Usually, light emitted from the light source unit 210 is split by the diffraction grating 230 to the zeroth-order diffraction ray and the ± first order diffraction rays, and three spots are formed on the optical disk 50 via the objective lens 300. The diffraction rays reflected by the optical disk 50 passes again through the objective lens 300 and are reflected by the beam splitter 240. The reflected rays form spots in the three light receiving elements via the condenser lens 260.

Consequently, in the actuator servo circuit 140, the differential signal $PP_{main}$ corresponding to the zeroth-order diffraction ray is calculated as "$PP_{main}=0$" when the spot of the zeroth-order diffraction ray on the optical disk 50 is immediately on a groove or land formed in the surface of the optical disk 50. When the position of the beam spot of the zeroth-order diffraction ray on the optical disk 50 is shifted from position immediately on the groove or land to the right or left using the radial direction of the optical disk 50 as a reference, it is calculated as "$PP_{main}>0$" or "$PP_{main}<0$". Consequently, tracking servo is performed, which moves the position of the beam spot of the zeroth-order diffraction ray on the optical disk 50 in the radial direction using "$PP_{main}=0$" as a target value.

However, in the case of moving the position of the beam spot on the optical disk 50 in the radial direction of the optical disk 50, if only the objective lens 300 is moved in the radial direction in a state where the whole optical pickup device 200 is fixed, the position of the beam spot of the zeroth-order diffraction ray on the first light receiving element also moves in the direction perpendicular to the partition line. Even when the position of the beam spot of the zeroth-order diffraction ray on the optical disk 50 is formed on the groove or land, the differential signal calculated by the light reception signal of the zeroth-order diffraction ray does not become "$PP_{main}=0$". Consequently, a push-pull offset occurs, and the tracking servo cannot be performed properly.

Therefore, as described above, in the DPP method using three beams, the push-pull signals $PP_{sub}$ are calculated also in the ± first-order diffraction rays, the DPP signal is calculated as shown in (Equation 3). The tracking servo is performed by using the calculated DPP signal as a tracking error signal.

Namely, when the pitch of grooves formed in the surface of the optical disk 50 is set as "GP" and the coordinate axis in the radial direction of the optical disk 50 is set as "v", the push-pull signals $PP_{main}$, $PP_{sub1}$, and $PP_{sub2}$ are expressed as (Equation 4) to (Equation 6), respectively. The DPP signal is calculated as (Equation 7) from (Equation 3) to (Equation 6), and a push-pull offset is cancelled. Therefore, in the embodiment, by performing the tracking servo on the basis of the calculated DPP signal, proper tracking servo can be performed.

$$PP_{main} = \sin\left(2\pi \cdot \frac{v}{GP}\right) + \text{off} \quad \text{(Equation 4)}$$

$$PP_{sub1} = A\sin\left(2\pi \cdot \frac{v + \Delta v}{GP}\right) + \text{off} \quad \text{(Equation 5)}$$

$$PP_{sub2} = A\sin\left(2\pi \cdot \frac{v - \Delta v}{GP}\right) + \text{off} \quad \text{(Equation 6)}$$

$$DPP = \left\{1 - \cos\left(2\pi \cdot \frac{\Delta v}{GP}\right)\right\}\sin\left(2\pi \cdot \frac{v}{GP}\right) + \text{off} \quad \text{(Equation 7)}$$

"v" denotes the position in the radial direction of a beam spot formed by the zeroth-order diffraction ray measured from the center of tracks on which data is recorded in the optical disk 50. "$\Delta v$" denotes a shift amount in the radial direction of the optical disk 50 of beam spots formed by the ± first-order diffraction rays measured from the beam sot formed by the zeroth-order diffraction ray on the optical disk 50. "off" indicates a push-pull offset which occurs when the spot on the detector 270 shifts in a direction perpendicular to the partition line of the detector 270 as the objective lens 300 moves in the radial direction of the optical disk 50.

On the other hand, generally, in an ideal state, as shown in (Equation 8), the angle of the diffraction grating 230 is adjusted so as to satisfy "$\Delta v = GP/2$" in (Equation 7). However, for example, when the rotation axis of the optical disk 50 and the center of tracks formed in the optical disk 50 do not match, or when the objective lens 300 is not on an axis perpendicular to a track in the optical disk 50 like in the case where the objective lens 300 moves in the radial direction of the optical disk 50 and is not on the slider axis as shown in FIG. 3(*a*), "$\Delta v$" shifts from the value of "GP/2". Consequently, (Equation 8) is not satisfied, and the DPP amplitude fluctuates according to the value of "$\Delta v$" (refer to FIG. 3(*b*)).

$$DPP = 2\sin\left(2\pi \cdot \frac{v}{GP}\right) + \text{off} \quad \text{(Equation 8)}$$

Therefore, in the embodiment, as described below by forming the diffraction grating 230 in a special shape, the tracking error signal by which fluctuations in the DPP signal amplitude are suppressed, and the push-pull offset can be cancelled can be obtained. By employing a periodical structure in both of the vertical and horizontal directions as the structure of the diffraction grating 230, position adjustment of the diffraction grating is made unnecessary at the time of assembling of an optical pickup device.

Concretely, in the diffraction grating 230 of the embodiment, as shown in FIG. 3, grooves are provided at predetermined cycles in the track direction of the optical disk 50. Two kinds of lattice grooves of first lattice grooves 231 and second lattice grooves 232 arranged alternately at a predetermined pitch P in the radial direction of the optical disk 50 are provided. The cycles in the track direction of the second lattice groove 232 (hereinbelow, called "groove cycles" are shifted from the groove cycles of the first lattice groove 231 by "½" or "¼".

In the diffraction grating 230, when the pitch of the grooves (hereinbelow, called "groove pitch") formed in the surface of the optical disk 50 is "GP", the effective diameter of a light beam is "D", the wavelength of the light beam is "λ", and the numerical aperture of the objective lens 300 is "NA", in the case of shifting the groove cycles by "½", the pitch "P" of arranging the first and second lattice grooves 231 and 232 (hereinbelow, called "arrangement pitch") is specified as (Equation 1). In the case of shifting the groove cycles by "¼", the pitch "P" is specified as (Equation 2).

$$P = \frac{\lambda \cdot D}{(2n+1) \cdot GP \cdot NA} \quad \text{(Equation 1)}$$

$$P = \frac{\lambda \cdot D}{(4n+2) \cdot GP \cdot NA} \quad \text{(Equation 2)}$$

The effective diameter D of a light beam corresponds to the diameter of a light flux used in the objective lens 300, and "n" indicates a natural number. The details of the arrangement pitch "P" specified in the embodiment will be described later.

In the embodiment, by using the diffraction grating 230 having such a special shape in the optical pickup device 200, ± first-order diffraction rays are reflected by the optical disk 50 and detected by the detector 270. On the basis of light reception signals of the detected ± first-order diffraction rays, as described above, the differential signals $PP_{sub1}$ and $PP_{sub2}$ are calculated by the actuator servo circuit 140. On the basis of the calculated differential signals, a tracking error signal is calculated. In such a manner, the tracking error signal capable of suppressing the push-pull signal amplitude of the ± first-order diffraction rays and cancelling the push-pull offset can be obtained. In the embodiment, the diffraction grating 230 can be also realized by a liquid crystal panel.

The arrangement pitch "P" at which the first and second lattice grooves 231 and 232 are arranged in the diffraction grating 230 in the embodiment will now be described.

Before the arrangement pitch "P" of the embodiment is explained, with reference to FIGS. 4 to 7, a result of simulation of the push-pull signal amplitude in the case of simply reducing the arrangement pitch "P" by increasing a natural number "m" in (Equation 9) at the arrangement pitch P shown in (Equation 9) will be described. In (Equation 9), "D" indicates the above-described effective diameter.

$$P = \frac{D}{m} \quad \text{(Equation 9)}$$

($m$ is natural number)

FIGS. 4 to 7 are diagrams showing results of simulation of the push-pull signal amplitude in the case where the arrangement pitch "P" is defined by (Equation 9), and are graphs (I) showing the values of push-pull signal amplitudes for the lattice grooves. Each of FIGS. 4 to 7 is a graph showing the arrangement pitch "P" on the lateral axis and the normalized value of the push-pull amplitude on the vertical axis while changing the positional shift with respect to the objective lens of the diffraction grating 230 every 5% from 0% to 25% with respect to the repetitive cycles of the first and second lattice grooves 231 and 232, that is, the length of "2P".

Figure 4:
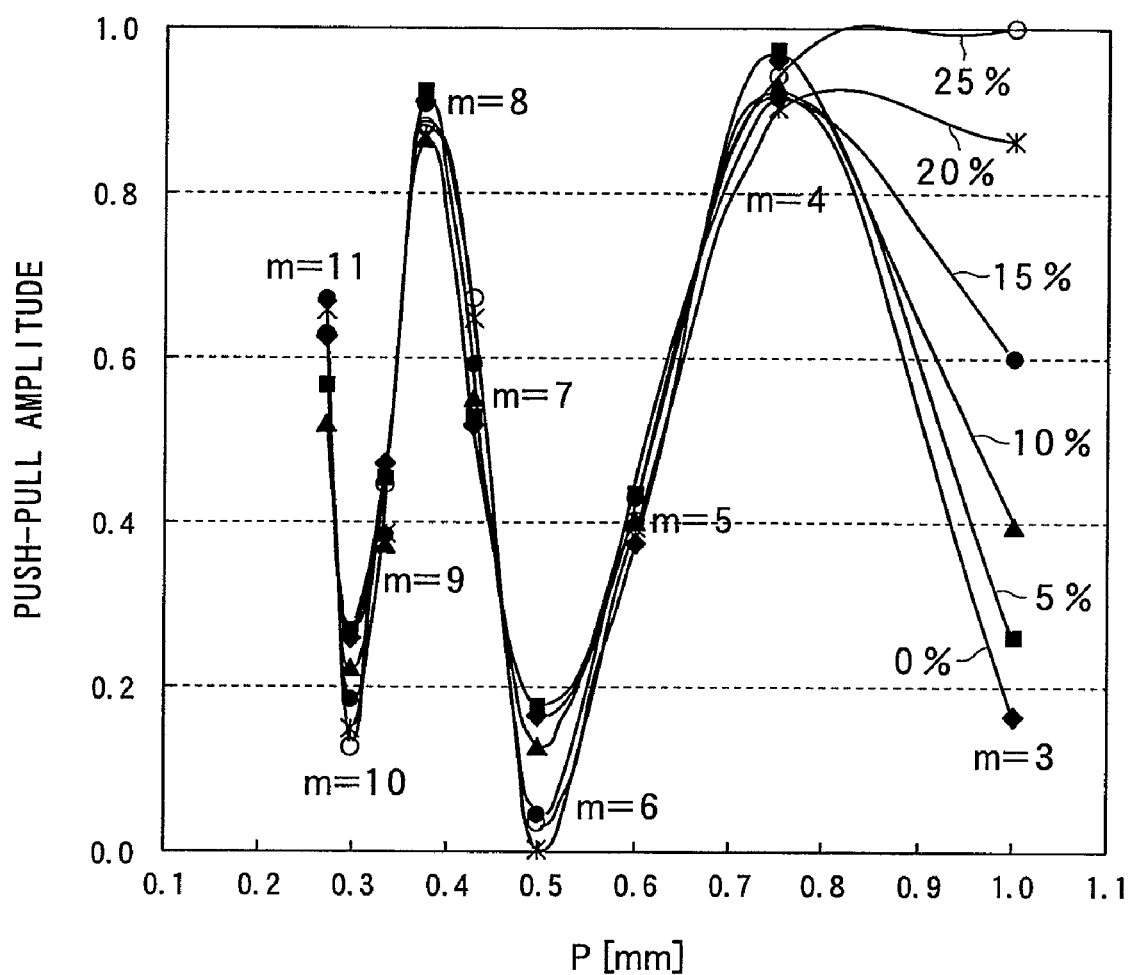
FIG. 4 is a diagram showing a result of simulation of the amplitudes of push-pull signals in the case where an arrangement pitch "P" is defined by Equation 9 and is a graph (I) showing the values of the amplitudes of push-pull signals in lattice grooves.
Figure 5:
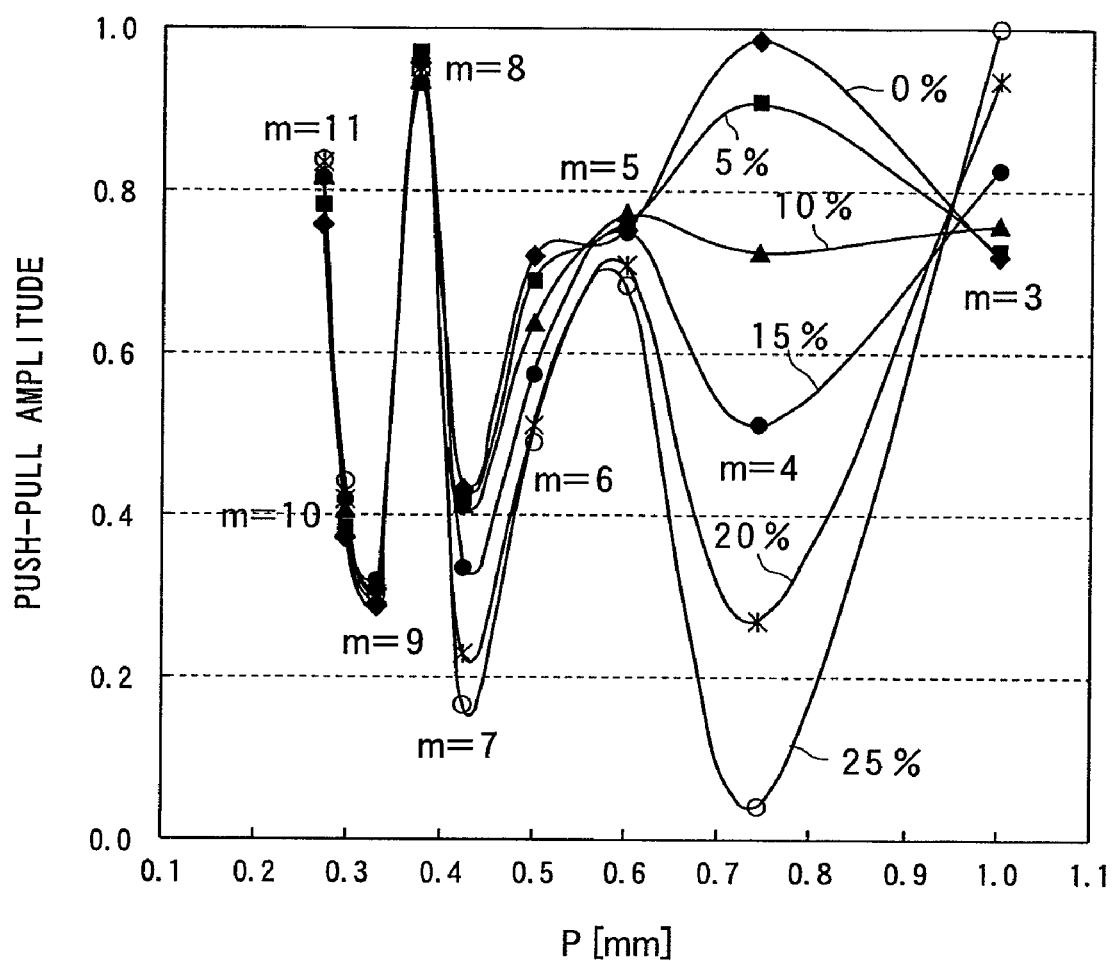
FIG. 5 is a diagram showing a result of simulation of the amplitudes of push-pull signals in the case where the arrangement pitch "P" is defined by Equation 9 and is a graph (II) showing the values of the amplitudes of push-pull signals in lattice grooves.
Figure 6:
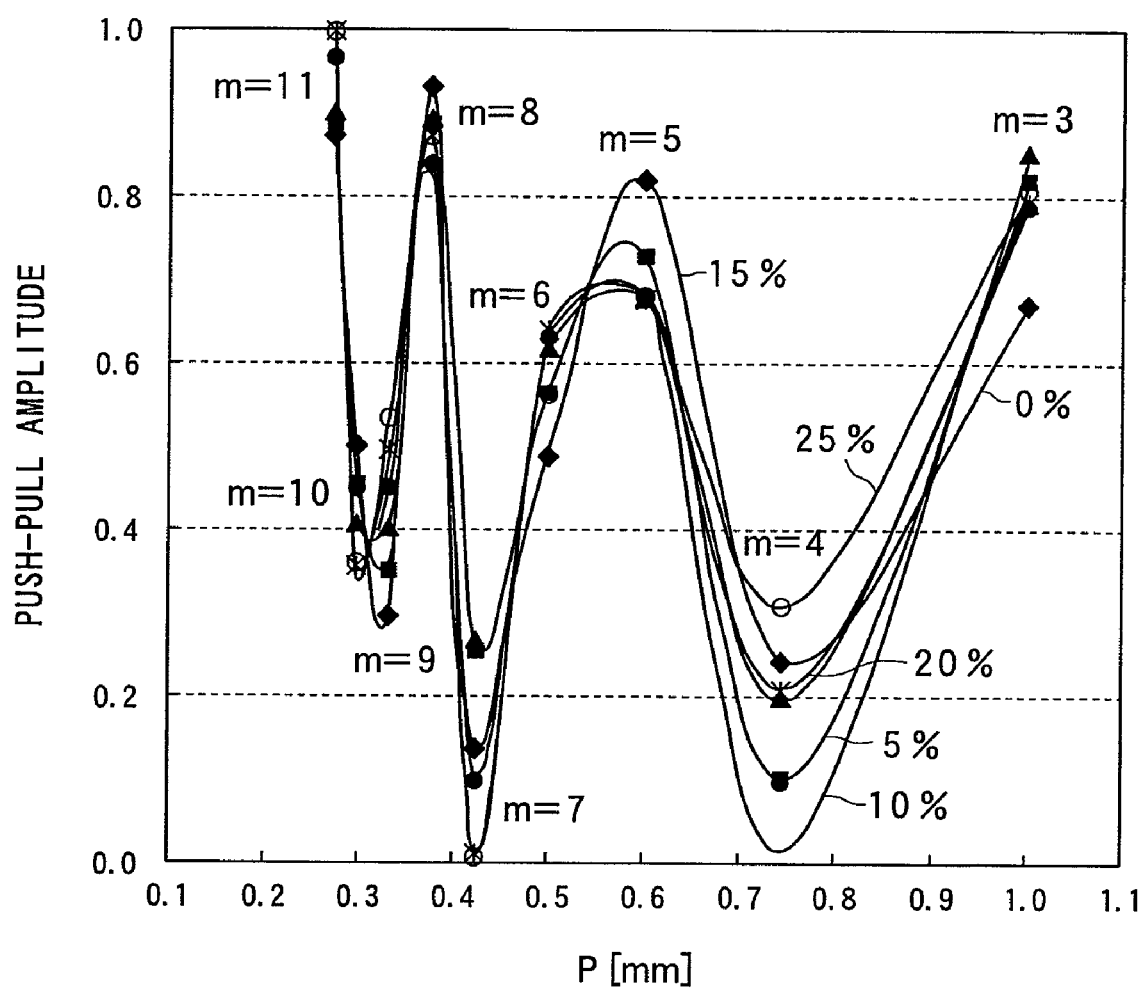
FIG. 6 is a diagram showing a result of simulation of the amplitudes of push-pull signals in the case where an arrangement pitch "P" is defined by Equation 9 and is a graph (III) showing the values of the amplitudes of push-pull signals in lattice grooves.
Figure 7:
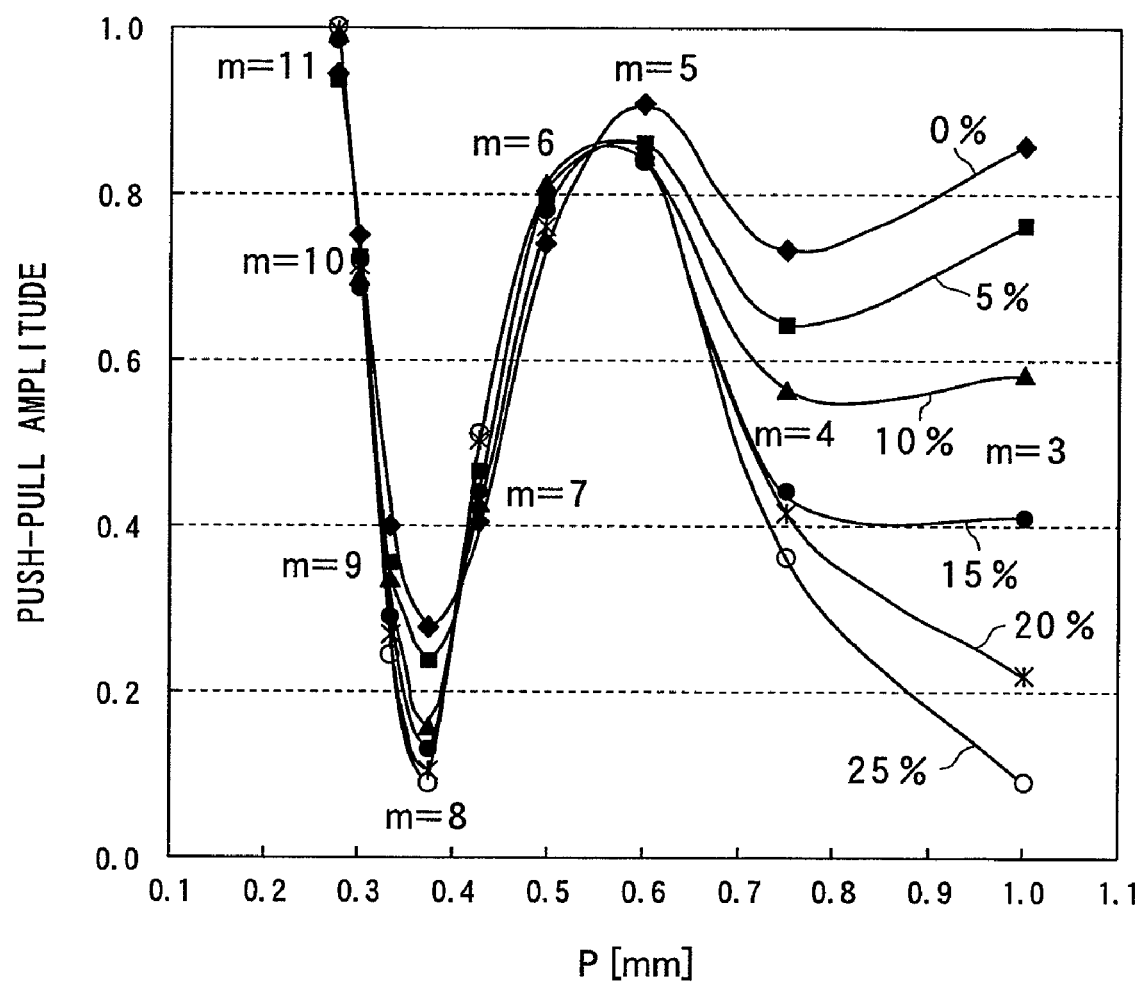
FIG. 7 is a diagram showing a result of simulation of the amplitudes of push-pull signals in the case where the arrangement pitch "P" is defined by Equation 9 and is a graph (IV) showing the values of the amplitudes of push-pull signals in lattice grooves.

In the following description, in the simulation results shown in FIGS. 4 and 5, a BD-RE is assumed as the optical disk 50, and the numerical aperture "NA=0.85", the wavelength "λ=0.405 μm" of the light beam, the groove pitch "GP=0.32 μm", and the effective diameter "D=3.0 mm" are used. In the simulation results shown in FIGS. 6 and 7, a DVD-RAM is assumed as the optical disk 50, and the numerical aperture "NA=0.6", the wavelength "λ=0.65 μm" of the light beam, the groove pitch "GP=1.48 μm", and the effective diameter "D=3.0 mm" are used.

The fluctuations in the DPP signal amplitude are caused by changes in Δv in (Equation 7). To erase Δv in (Equation 7), it is sufficient to suppress the push-pull signal amplitude in the ± first-order diffraction rays expressed by (Equation 5) and (Equation 6). Therefore, to suppress fluctuations in the DPP signal amplitude, it is an issue whether or not the push-pull signal amplitude of the ± first-order diffraction rays can be suppressed without requiring positional adjustment of the diffraction grating at the time of assembling an optical pickup device in the case where the arrangement pitch "P" is reduced by increasing the natural number "m" in (Equation 9) at the arrangement pitch "P" shown in (Equation 9).

However, as shown in FIGS. 4 to 7, in the case of shifting the groove cycle (in the track direction) of the first lattice groove 231 in the diffraction grating 230 by "½", that is, giving a phase difference "π", or in the case of shifting the groove cycle by "¼", that is, giving a phase difference "π/2", the push-pull amplitude is suppressed at a specific arrangement pitch "P". However, in this case, the push-pull amplitude cannot be suppressed at the other arrangement pitches "P". With respect to a positional shift of the diffraction grating 230 as well, although the push-pull amplitude can be suppressed in the case of a specified positional shift, the push-pull amplitude cannot be suppressed in the case where any other positional shift occurs.

In the embodiment, as will be described below, when the arrangement pitch "P" has the relations of (Equation 1) and (Equation 2), the push-pull amplitude can be suppressed most effectively. It will be described in detail.

Figure 16:
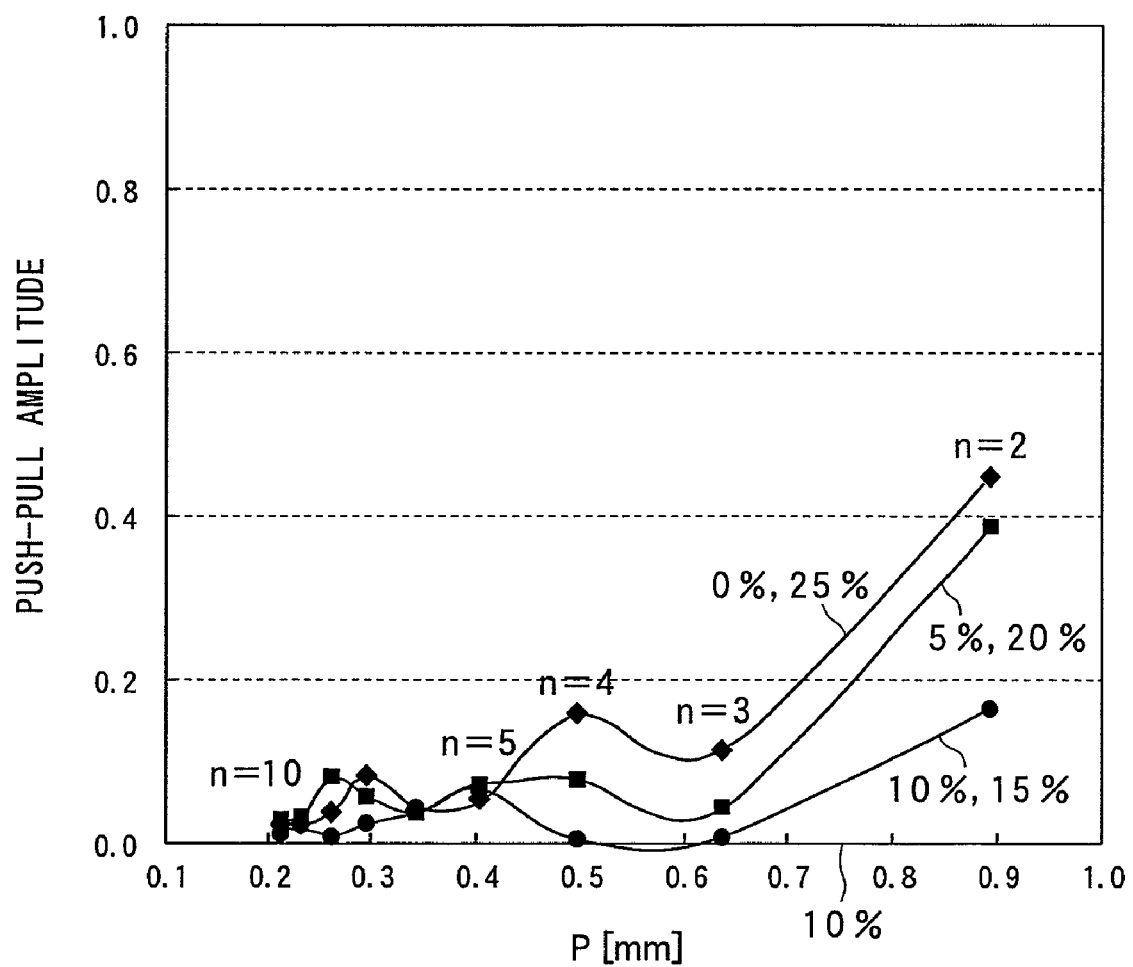
FIG. 16 is a graph (I) showing values of amplitudes of push-pull signals in lattice grooves in a diffraction grating in which the first and second lattice grooves are arranged at a predetermined arrangement pitch of the embodiment.
Figure 17:
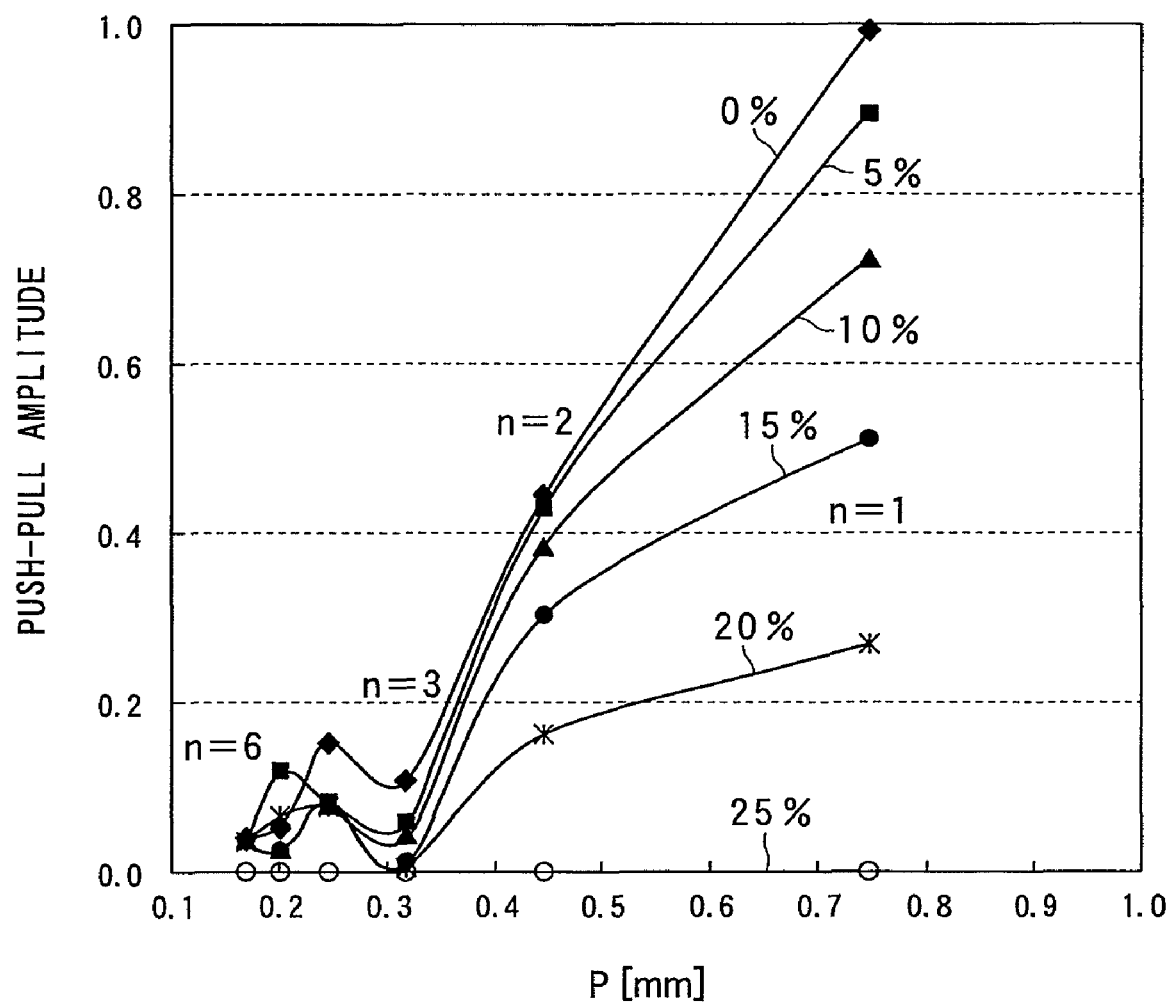
FIG. 17 is a graph (II) showing values of amplitudes of push-pull signals in lattice grooves in a diffraction grating in which the first and second lattice grooves are arranged at a predetermined arrangement pitch of the embodiment.

The arrangement pitch in the embodiment will be described with reference to FIGS. 8 to 15. FIGS. 8 to 15 are diagrams for explaining the arrangement pitch "P" at which the first and second lattice grooves 231 and 232 in the diffraction grating of the embodiment are arranged. FIGS. 16 and 17 are graphs showing values of the push-pull signal amplitudes for the lattice grooves in the diffraction grating in which the first and second lattice grooves 232 are arranged at a predetermined arrangement pitch in the embodiment.

In the following description, the diffraction rays applied to the optical disk 50, that is, diffraction rays diffracted by the surface of the optical disk 50 of the light beam will be called reflected diffraction rays. The reflected diffraction rays will be described so as to be distinguished from the diffraction rays diffracted by the diffraction grating 230. In the following description, a zeroth-order reflected diffraction ray is generated from the zeroth-order diffraction ray, and ± first-order reflected diffraction rays are generated from the ± first-order diffraction rays.

In the following description, a − first-order diffraction ray, that is, a light beam forming a − first-order beam spot will be taken as an example. In the following description, the track direction in the coordinates on the objective lens 300 is set as "x", and the radial direction is set as "y".

When an amplitude distribution is expressed as f(x,y) and a phase distribution is expressed as φ(x,y), a light beam incident on the objective lens 300 has a complex amplitude distribution expressed by (Equation 10). When the radius of the pupil of the objective lens 300 is "1", in the case where incident light is uniform-intensity light, f(x,y) can be expressed by a function shown in (Equation 11).

$$E_{in} = f(x, y)\exp[-i\phi(x, y)] \quad \text{(Equation 10)}$$

$$f(x, y) = \begin{cases} 1 & \dots x^2 + y^2 \le 1 \\ 0 & \dots x^2 + y^2 > 1 \end{cases} \quad \text{(Equation 11)}$$

Since the light beam as the diffraction rays is diffracted also by the optical disk 50 as described above, according to the scalar diffraction theory, the complex amplitude distributions of the zeroth-order reflected diffraction ray and the ± first-order reflected diffraction rays in the − first-order light beam are expressed by (Equation 12) to (Equation 14).

zeroth-order reflected diffraction ray:

$$E_0 = f(x,y)\exp[-i\phi(x,y)] \quad \text{(Equation 12)}$$

+ first-order reflected diffraction ray:

$$E_{+1} = f\left(x, y - \frac{1}{q}\right)\exp\left[\begin{array}{c}-i\phi\left(x, y - \frac{1}{q}\right) - \\ iH - i2\pi\frac{v}{GP}\end{array}\right] \quad \text{(Equation 13)}$$

− first-order reflected diffraction ray:

$$E_{-1} = f\left(x, y - \frac{1}{q}\right)\exp\left[\begin{array}{c}-i\phi\left(x, y+\frac{1}{q}\right)-\\ iH + i2\pi\dfrac{v}{GP}\end{array}\right]$$ (Equation 14)

Where $$q \equiv GP\left(\frac{NA}{\lambda}\right)$$ (Equation 15)

"NA", "λ", "GP", and "v" denote, in a manner similar to the above, the numerical aperture of the objective lens 300, the wavelength of the light beam, the groove pitch of the optical disk 50, and the radial-direction position of a beam spot formed on the optical disk 50, respectively. "H" denotes the phase difference between the zeroth-order reflected diffraction ray and ± first-order reflected diffraction rays reflection-diffracted by the optical disk 50, determined by predetermined values such as the wavelength of the light beam and the depth of the groove.

Figure 8:
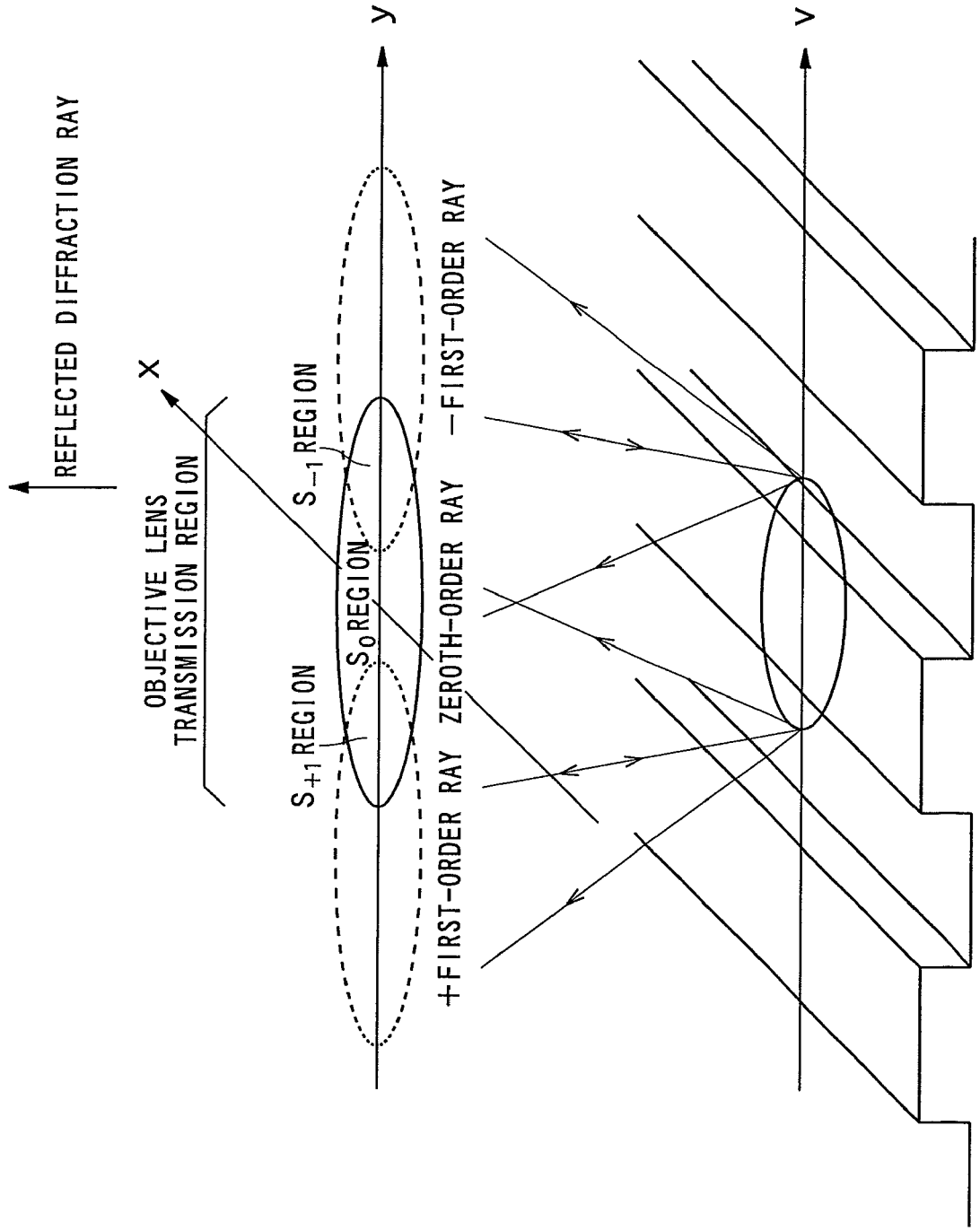
FIG. 8 is a diagram (I) for explaining the arrangement pitch P at which first and second lattice grooves in the diffraction grating of the embodiment are arranged.

Intensities "Is$_{+1}$" and "Is$_{-1}$" in regions "S$_{+1}$" and "S$_{-1}$" as regions where the zeroth-order reflected diffraction ray and the ± first-order reflected diffraction rays in the − first-order light beam shown in FIGS. 8 and 9 using the equations (Equation 12) to (Equation 15) overlap, that is, interfere each other in the detector 270 are calculated by equations (Equation 3) to (Equation 15).

$$I_{s_{+1}} = |E_0 + E_{+1}|^2$$ (Equation 16)

$$= |\exp[-i\phi(x, y)] +$$

$$\exp\left[-i\phi\left(x, y - \frac{1}{q}\right) - iH - i2\pi\frac{v}{GP}\right]|^2$$

$$= 2 + 2\cos\left(\phi(x, y) - \phi\left(x, y - \frac{1}{q}\right) - H - 2\pi\frac{v}{GP}\right)$$

$$= 2 + 2\cos(\phi_{+1}(x, y) + A)$$

where $$\phi_{+1}(x, y) \equiv \phi(x, y) - \phi\left(x, y - \frac{1}{q}\right),$$ (Equation 17)

$$A \equiv -H - 2\pi\frac{v}{GP}$$

$$I_{s_{-1}} = |E_0 + E_{-1}|^2$$ (Equation 18)

$$= |\exp[-i\phi(x, y)] +$$

$$\exp\left[-i\phi\left(x, y + \frac{1}{q}\right) - iH + i2\pi\frac{v}{GP}\right]|^2$$

$$= 2 + 2\cos\left(\phi(x, y) - \phi\left(x, y + \frac{1}{q}\right) - H + 2\pi\frac{v}{GP}\right)$$

$$= 2 + 2\cos(\phi_{-1}(x, y) + B)$$

where $$\phi_{-1}(x, y) \equiv \phi(x, y) - \phi\left(x, y + \frac{1}{q}\right), B \equiv -H + 2\pi\frac{v}{GP}$$ (Equation 19)

Light intensity "Is$_0$" in a region where the zeroth-order ray and ± first-order rays do not interfere each other, that is a region "S$_0$" in FIGS. 8 and 9 is calculated as (1.0) as shown in (Equation 20).

$$I_{S_0} = |E_0|^2 = |\exp[-i\phi(x,y)]|^2 = 1.0$$ (Equation 20)

The reflected diffraction ray reflection-diffracted by the optical disk 50 passes again through the objective lens 300 and forms a beam spot on the detector 270. Since the intensity distribution of the spot on the detector 270 can be regarded almost the same as that on the objective lens 300, that is, as a distribution having a similar figure, a push-pull signal PP obtained by the half-split light receiving elements in the detector 270 can be expressed by (Equation 21).

$$PP = S_{+1}I_{S_{+1}} - S_{-1}I_{S_{-1}} + \delta$$ (Equation 21)

"S$_{+1}$" and "S$_{-1}$" denote areas of the regions "S$_{+1}$" and "S$_{-1}$", respectively. As shown in FIGS. 8 and 9, "δ" denotes the difference in the area of the region "S$_0$" of light incident on neighboring light receiving elements and expresses the push-pull offset.

The push-pull signal PP can be calculated on the basis of the areas of the interference regions and the light intensities in the interference regions. Therefore, in the embodiment, by devising φ(x,y) in the equations (Equation 17) and (Equation 19), that is, the phase distribution of the incident light on the objective lens 300, the diffraction grating 230 obtaining the above-described effects is constructed.

In the following description, concrete values will be given to the phase distribution φ(x,y).

First, the zeroth-order diffraction ray from the diffraction grating 230 will be described.

The zeroth-order diffraction ray has the same complex amplitude distribution as that of light incident on the diffraction grating 230. Therefore, the phase distribution of light incident on the diffraction grating 230 has a uniform value irrespective of the positions. Specifically, when "φ(x,y)=φ$_0$", the above described (Equation 16) to (Equation 19) are expressed as (Equation 22) to (Equation 24).

$$\phi_{+1}(x, y) = \phi_{-1}(x, y) = 0$$ (Equation 22)

$$I_{s_{+1}} = 2 + 2\cos A = 2 + 2\cos\left(H + 2\pi\frac{v}{GP}\right)$$ (Equation 23)

$$I_{s_{-1}} = 2 + 2\cos B = 2 + 2\cos\left(H - 2\pi\frac{v}{GP}\right)$$ (Equation 24)

Since usually "S$_{+1}$=S$_{-1}$", when "S$_{+1}$=S$_{-1}$≡S$_{\pm 1}$", the push-pull signal PP$_{main}$ of the zeroth-order diffraction ray is finally expressed as (Equation 25). The push-pull signal PP$_{main}$ of the zeroth-order diffraction ray is obtained as a sin wave of the beam spot position (v) on the optical disk 50.

$$PP_{main} = 2S_{\pm 1}\left\{\cos\left(H + 2\pi\frac{v}{GP}\right) - \cos\left(H - 2\pi\frac{v}{GP}\right)\right\} + \delta$$ (Equation 25)

-continued $$= -2S_{\pm 1} \sin H \sin\left(2\pi \frac{v}{GP}\right) + \delta$$

Next, the ± first-order diffraction rays from the diffraction grating 230 will be described.

With respect to the push-pull signals $PP_{sub}$ of the ± first-order diffraction rays, since the phases of the ± first-order diffraction rays from the diffraction grating 230 are proportional to a shift amount of the lattice grooves, when the phase of a uniform light beam incident on the diffraction grating 230 is set as "$\phi_0$", the phase distribution $\phi(x,y)$ of the ± first-order diffraction rays is expressed as (Equation 26).

$$\phi(x, y) = \phi_0 + 2\pi \cdot \frac{\Delta s(y)}{s} = \phi_0 + \Delta\phi(y) \quad \text{(Equation 26)}$$

where $$\Delta\phi(y) \equiv 2\pi \cdot \frac{\Delta s(y)}{s}$$

Figure 10:
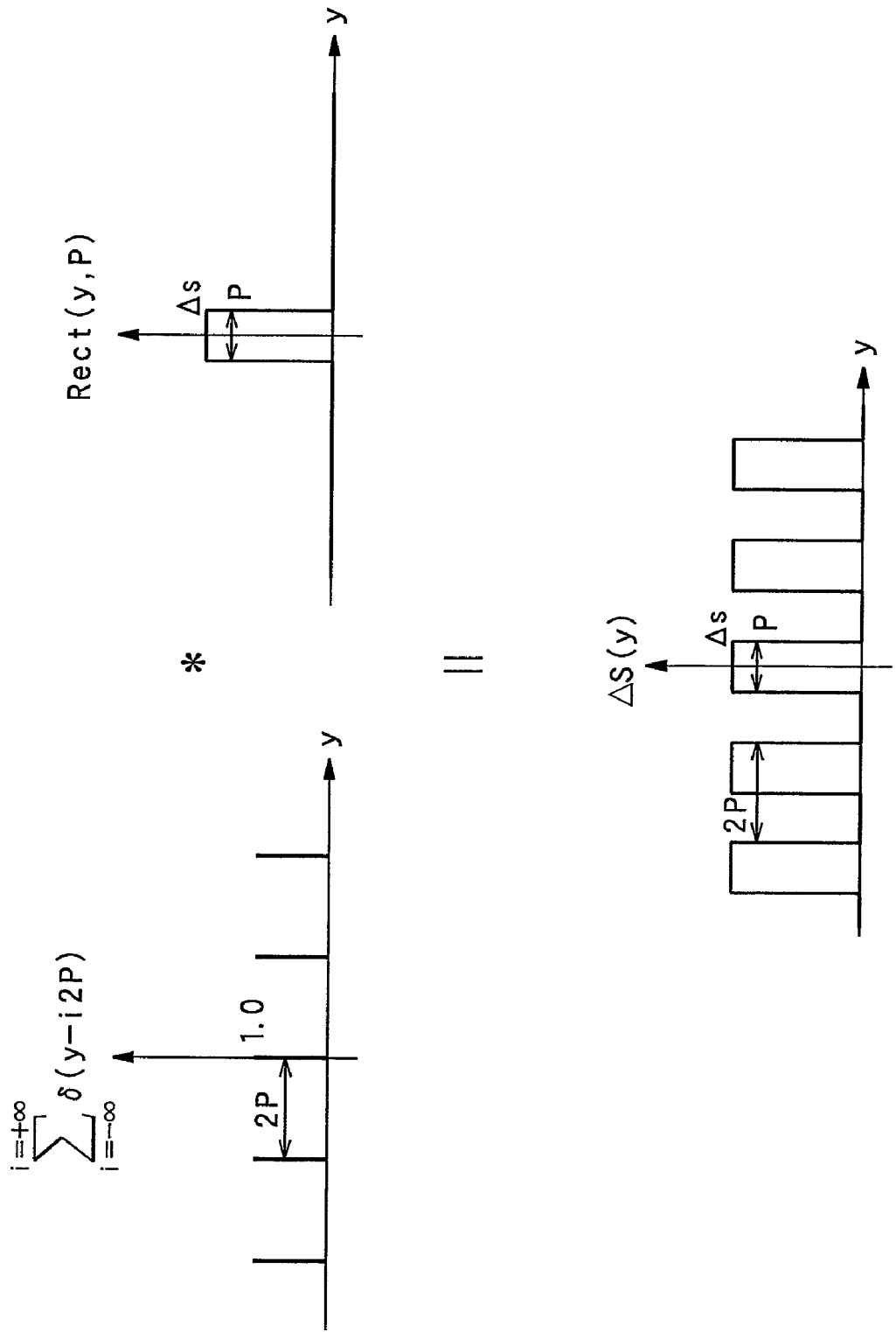
FIG. 10 is a diagram (III) for explaining the arrangement pitch P at which the first and second lattice grooves in the diffraction grating of the embodiment are arranged.

"s" indicates the groove cycle of the lattice grooves and is determined by the distance of the spot center of three beams formed on the optical disk 50. "$\Delta s(y)$" denotes a function expressing the shift amount distribution of the groove cycles and is expressed by (Equation 27) as shown in FIG. 10.

$$\Delta s(y) = \sum_{i=-\infty}^{i=+\infty} \delta(y - i2P) * Rect(y, P) \quad \text{(Equation 27)}$$

"i" indicates an integer, and "*" denotes convolution operation. "$\delta(y)$" and "$Rect(y,P)$" denote a delta function and a rectangle function, respectively and are defined by (Equation 28) and (Equation 29), respectively.

$$\delta(y) = \begin{cases} 1 & \dots \text{ if } y = 0 \\ 0 & \dots \text{ if } y \neq 0 \end{cases} \quad \text{(Equation 28)}$$

$$Rect(y, P) = \begin{cases} \Delta s & \dots \text{ if } |y| \leq \frac{P}{2} \\ 0 & \dots \text{ if } |y| > \frac{P}{2} \end{cases} \quad \text{(Equation 29)}$$

For example, when the diffraction grating 230 is applied to the optical disk 50 which is a BD-RE and the deviation of the groove cycles of the first and second lattice grooves 231 and 232 in the diffraction grating 230 and the arrangement pitch "P" of the first and second lattice grooves 231 and 232 are specified as shown by (Equation 1) or (Equation 2), respectively, the push-pull signal PP in the ± first-order diffraction rays is calculated as below.

In this case, the numerical aperture used for recording/reproducing data to/from the optical disk 50 as a BD-RE is "NA=0.85", the wavelength of the light beam is "λ=0.405 µm", and the groove pitch is "GP=0.32 µm". Consequently, "q" described below is calculated as 0.672 by (Equation 15).

Figure 11:
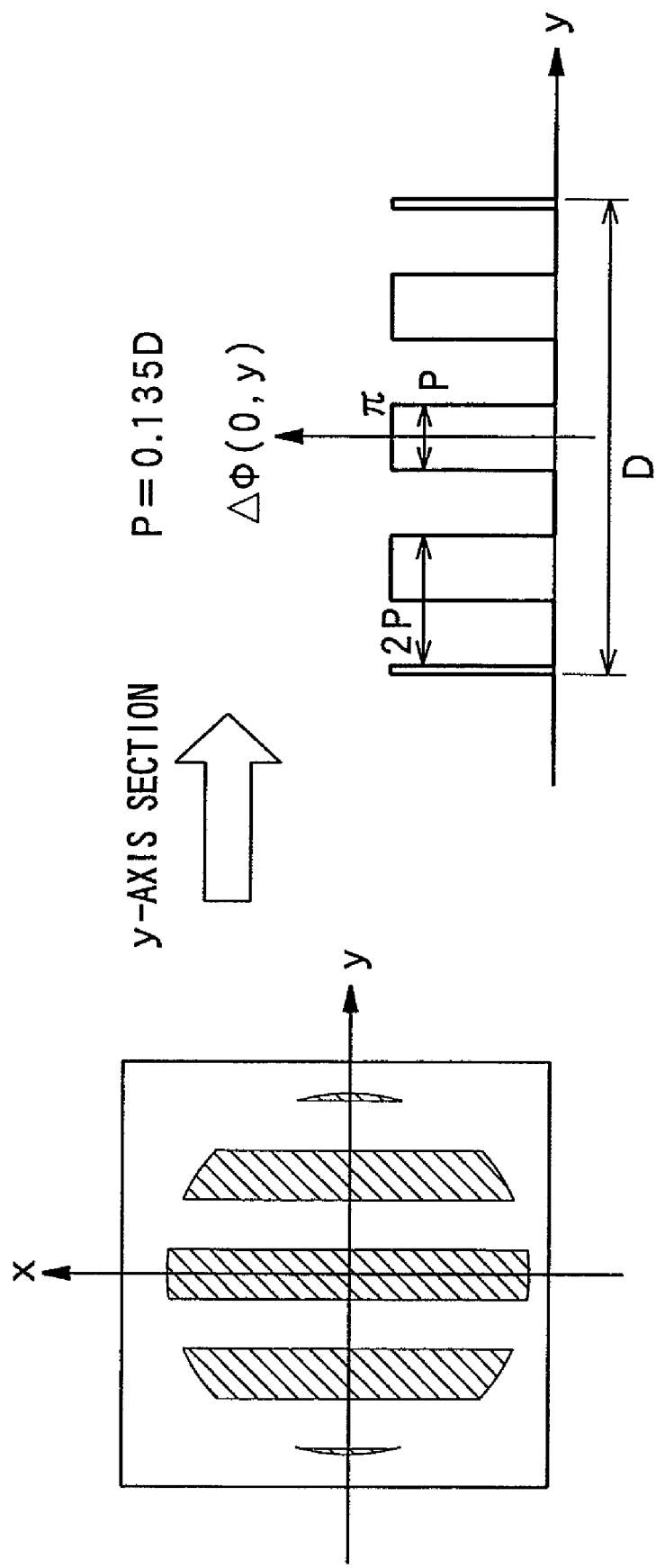
FIG. 11 is a diagram (IV) for explaining the arrangement pitch P at which first and second lattice grooves in the diffraction grating of the embodiment are arranged.

(1) In the case where the shift "$\Delta s/s$" of the groove cycles of the first and second lattice grooves 231 and 232 in the diffraction grating 230 is "½" and the arrangement pitch of the first and second lattice grooves 231 and 232 is "$P=D/\{(2n+1)\cdot q\}$" (where n denotes natural number), for example, when "n=5", ± first-order diffraction rays emitted from the diffraction grating 230 of the embodiment have the phase distribution "$\phi(x,y)$" shown in FIG. 11. When the ± first-order diffraction rays are reflection-diffracted by the optical disk 50 and the resultant rays are incident again on the objective lens 300, each of the rays has the phase distribution of the wave front of the of each of the diffraction-reflected diffraction rays shown in FIG. 12. In regions "$S+_1$" and "$S-_1$" as the interference regions shown in FIGS. 8 and 9, the phase distributions "$\phi+_1$" and "$\phi-_1$" have any one of three values "$+\pi$", "0", and "$-\pi$".

When the areas of the regions of "$\phi+_1=+\pi$", "$\phi+_1=0$", and "$\phi+_1=-\pi$" in the region "$S+_1$" are set as "$(S+_1)^{+\pi}$", "$(S+_1)^0$", and "$(S+_1)^{-\pi}$", respectively, and the areas of the regions of "$\phi-_1=+\pi$", "$\phi-_1=0$", and "$\phi-_1=-\pi$" in the region "$S-_1$" are set as "$(S-_1)^{+\pi}$", "$(S-_1)^0$", and "$(S-_1)^{-\pi}$", respectively, the push-pull signal $PP_{sub}$ in the ± first-order diffraction rays is expressed by (Equation 30) on the basis of (Equation 21).

"$(I_\delta)\phi$" denotes light intensity in a region where the phase is "$\phi$" in the region "S".

$$PP_{sub} = \{(S_{+1})^{+\pi} \cdot (I_{S_{+1}})^{+\pi} + (S_{+1})^0 \cdot (I_{S_{+1}})^0 + (S_{+1})^{-\pi} \cdot (I_{S_{+1}})^{-\pi}\} - \{(S_{-1})^{+\pi} \cdot (I_{S_{-1}})^{+\pi} + (S_{-1})^0 \cdot (I_{S_{-1}})^0 + (S_{-1})^{-\pi} \cdot (I_{S_{-1}})^{-\pi}\} + \delta \quad \text{(Equation 30)}$$

Under such conditions, first, a case where the diffraction grating 230 is disposed so that the phase distribution on the objective lens 300 becomes symmetrical in the radial direction of the optical disk 50 will be considered.

The ± first-order diffraction rays are reflection-diffracted by the optical disk 50 and are incident again on the objective lens 300 so that, as shown in FIG. 8, the regions "S" have the relations expressed by (Equation 31) and (Equation 32).

$$(S_{+1})^{+\pi} = (S_{-1})^{+\pi} = (S_{+1})^{-\pi} = (S_{-1})^{-\pi} \equiv (S_{\pm 1})^{\pm \pi} \quad \text{(Equation 31)}$$

$$(S_{+1})^0 = (S_{-1})^0 \equiv (S_{\pm 1})^0 \quad \text{(Equation 32)}$$

Therefore, when the equations (Equation 16) to (Equation 19) are used, the push-pull signal $PP_{sub}$ in the ± first-order diffraction rays is expressed by (Equation 33) on the basis of (Equation 31).

$$PP_{sub} = \quad \text{(Equation 33)}$$

$$(s_{\pm 1})^{\pm \pi}\{(I_{s_{+1}})^{+\pi} + (I_{s_{+1}})^{-\pi} - (I_{s_{-1}})^{+\pi} - (I_{s_{-1}})^{-\pi}\} + \delta =$$

$$2(s_{\pm 1})^{\pm \pi}\{\cos(\pi + A) + \cos(-\pi + A) - \cos(\pi + B) -$$

$$\cos(-\pi + B)\} + 2(S_{\pm 1})^0(\cos A - \cos B) + \delta =$$

$$2\{2(S_{\pm 1})^{\pm \pi} - (S_{\pm 1})^0\}\sin H \sin\left(2\pi \frac{v}{TP}\right) + \delta$$

Figure 12:
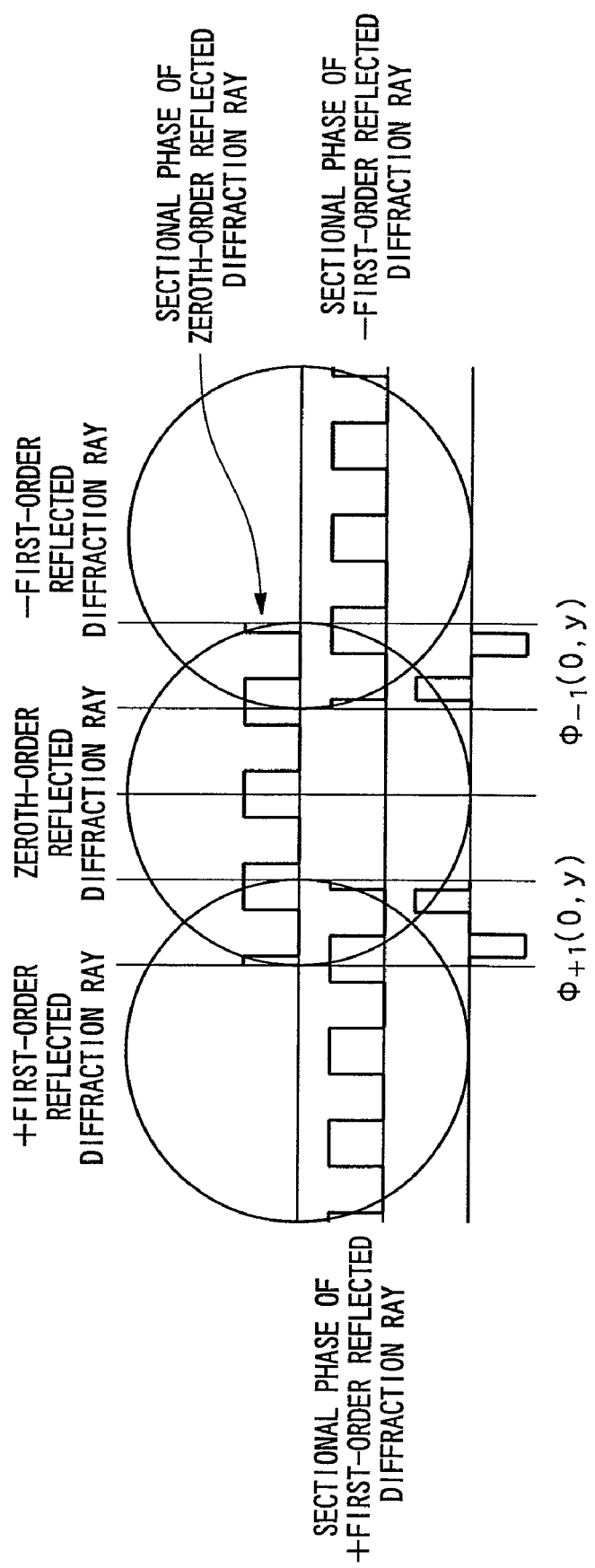
FIG. 12 is a diagram (V) for explaining the arrangement pitch P at which the first and second lattice grooves in the diffraction grating of the embodiment are arranged.

As understood from FIG. 12, as "$2(S\pm_1)\pm\pi \approx (S\pm_1)^0$". Consequently, the push-pull signal $PP_{sub}$ does not depend on "v" but is an approximate value of "$\delta$".

On the other hand, the phase distribution on the objective lens 300 is not always symmetrical in the radial direction of the optical disk 50. A case of disposing the diffraction grating 230 so that the phase distribution on the objective lens 300 shifts only by P/2 in the radial direction of the optical disk 50 will be considered.

When the ± first-order diffraction rays are reflection-diffracted by the optical disk 50 and are incident on the objective lens 300 under such conditions, the phase distribution of the wave front of each of the diffraction-reflected diffraction rays shown in FIG. 9 is obtained. At this time, as shown in FIG. 9, the regions "S" have the relations expressed by (Equation 34) to (Equation 36).

$$(S_{+1})^{+\pi} = (S_{-1})^{-\pi} \equiv (S_{\pm 1})^{\pm \pi} \quad \text{(Equation 34)}$$

$$(S_{+1})^{-\pi} = (S_{-1})^{+\pi} \equiv (S_{\pm 1})^{\mp \pi} \quad \text{(Equation 35)}$$

$$(S_{+1})^{0} = (S_{-1})^{0} \equiv (S_{\pm 1})^{0} \quad \text{(Equation 36)}$$

Therefore, using the equations (Equation 16) to (Equation 19), the push-pull signal $PP_{sub}$ in the ± first-order diffraction rays is expressed by (Equation 37) on the basis of (Equation 31).

$$PP_{sub} = \quad \text{(Equation 37)}$$
$$(s_{\pm 1})^{\pm \pi}\{(I_{s_{+1}})^{+\pi} - (I_{s_{-1}})^{-\pi}\} + (s_{\pm 1})^{\mp \pi}\{(I_{s_{+1}})^{-\pi} - (I_{s_{-1}})^{+\pi}\} +$$
$$(s_{\pm 1})^{0}\{(I_{s_{+1}})^{0} - (I_{s_{-1}})^{0}\} + \delta =$$
$$2(s_{\pm 1})^{\pm \pi}\{\cos(\pi + A) - \cos(-\pi + B)\} +$$
$$2(s_{\pm 1})^{\mp \pi}\{\cos(-\pi + A) - \cos(\pi + B)\} +$$
$$2(S_{\pm 1})^{0}(\cos A - \cos B) + \delta =$$
$$2\{(S_{\pm 1})^{\pm \pi} + (S_{\pm 1})^{\mp \pi} - (S_{\pm 1})^{0}\}\sin H \sin\left(2\pi \frac{v}{TP}\right) + \delta$$

Figure 13:
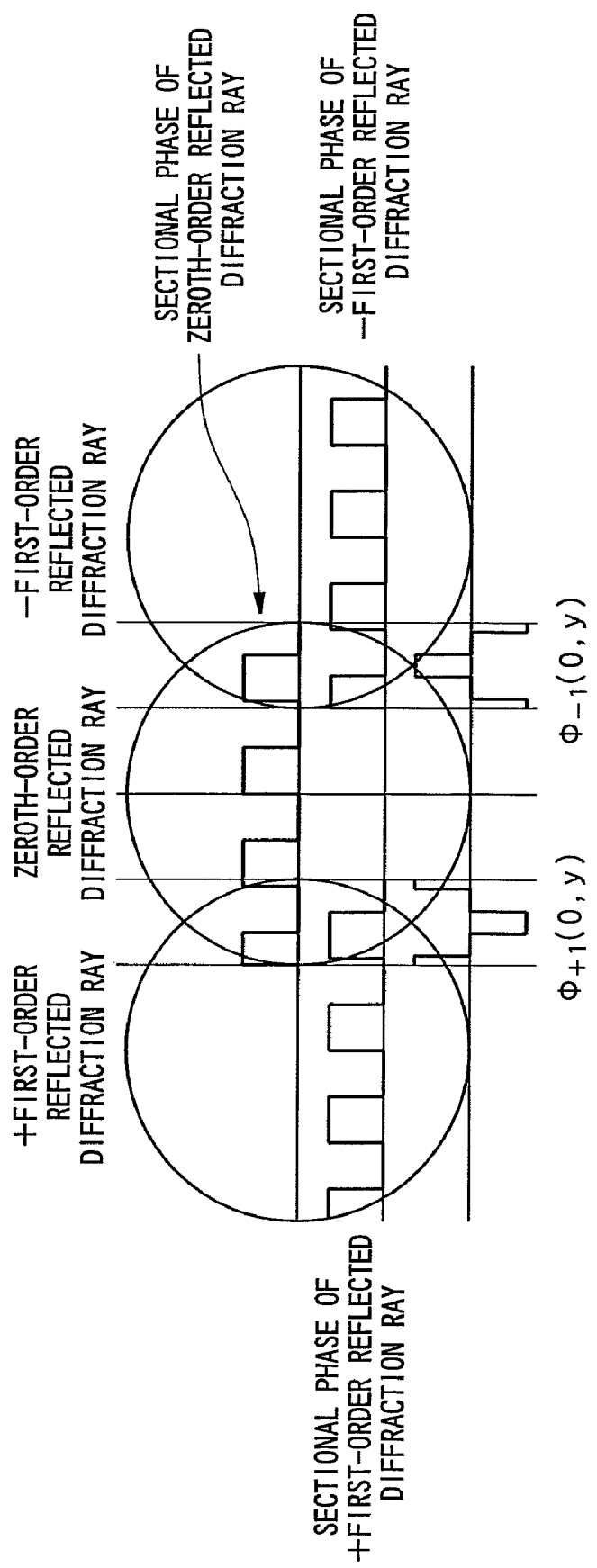
FIG. 13 is a diagram (VI) for explaining the arrangement pitch P at which the first and second lattice grooves in the diffraction grating of the embodiment are arranged.

As understood from FIG. 13, the relation of (Equation 38) is satisfied. Consequently, the push-pull signal $PP_{sub}$ expressed by (Equation 37) does not depend on "v" but becomes an approximate value of "$\delta$".

$$(S_{\pm 1})^{\pm \pi} + (S_{\pm 1})^{\mp \pi} \approx (S_{\pm 1})^{0} \quad \text{(Equation 38)}$$

As described above, in the case where the shift "Δs/s" of the groove cycles of the first and second lattice grooves 231 and 232 in the diffraction grating 230 is "½" and the arrangement pitch of the first and second lattice grooves 231 and 232 is "P=D/{(2n+1)·q}", even if the objective lens 300 and the diffraction grating 230 are deviated relatively in the radial direction of the optical disk 50, the push-pull signal $PP_{sub}$ does not depend on "v" but becomes an approximate value of "$\delta$".

Figure 14:
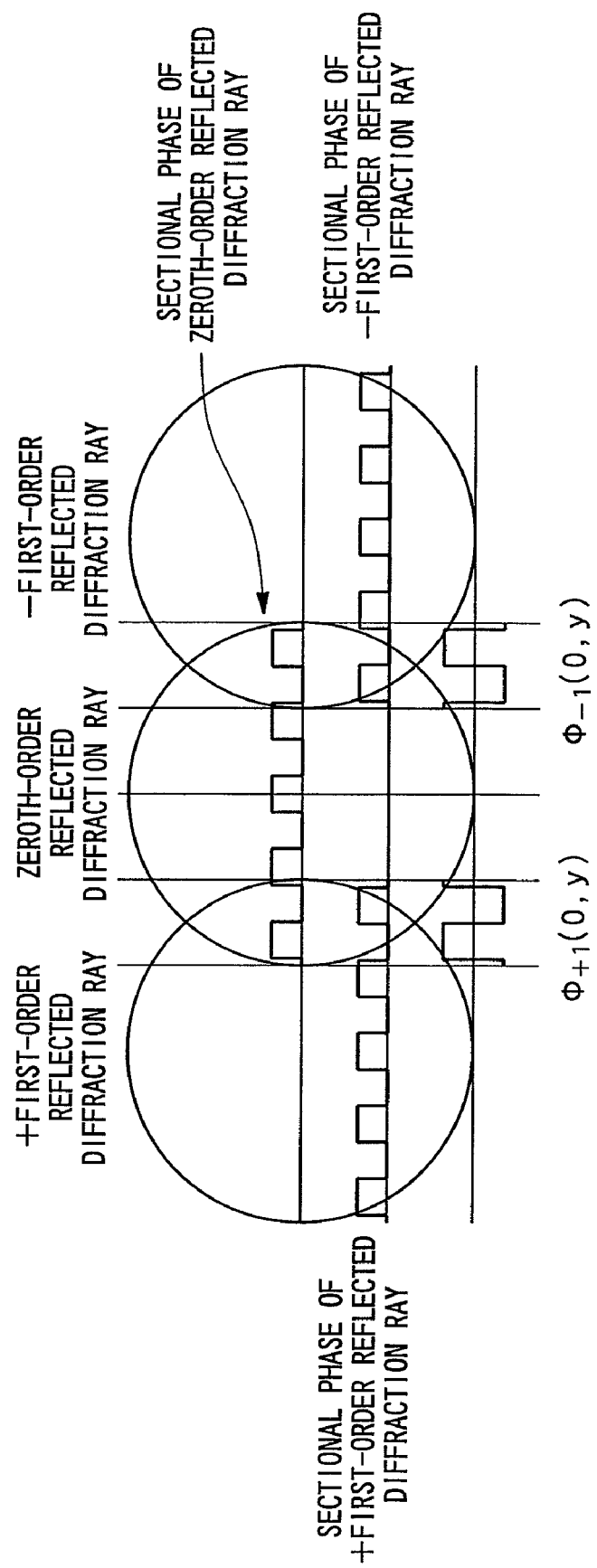
FIG. 14 is a diagram (VII) for explaining the arrangement pitch P at which first and second lattice grooves in the diffraction grating of the embodiment are arranged.

(2) In the case where the shift "Δs/s" of the groove cycles of the first and second lattice grooves 231 and 232 in the diffraction grating 230 is "¼" and the arrangement pitch of the first and second lattice grooves 231 and 232 is "P=D/{(4n+2)·q}" (where n denotes a natural number), for example, in the case where "n=3", when ± first-order diffraction rays are reflection-diffracted by the optical disk 50 and the resultant rays are incident again on the objective lens 300, each of the rays has the phase distribution of the wave front of the of each of the diffraction-reflected diffraction rays shown in FIG. 14. In regions "$S_{+1}$" and "$S_{-1}$" as the interference regions shown in FIGS. 8 and 9, the phase distributions "$\phi_{+1}$" and "$\phi_{-1}$" have either "+π/2" or "−π/2".

When the areas of the regions of "$\phi_{+1}=+\pi/2$" and "$\phi_{+1}=-\pi/2$" in the region "$S_{+1}$" are set as "$(S_{+1})^{+\pi/2}$" and "$(S_{+1})^{-\pi/2}$", respectively, and the areas of the regions of "$\phi_{-1}=+\pi/2$" and "$\phi_{-1}=-\pi/2$" in the region "$S_{-1}$" are set as "$(S_{-1})^{+\pi/2}$" and "$(S_{-1})^{-\pi/2}$", respectively, the push-pull signal $PP_{sub}$ in the ± first-order diffraction rays is expressed by (Equation 39) on the basis of (Equation 21). "$(Is_{\pm 1})\phi$" denotes light intensity in a region where the phase is "$\phi$" in the region "S".

$$PP_{sub} = \left\{ \begin{array}{c} (S_{+1})^{+\frac{\pi}{2}}(I_{s_{+1}})^{+\frac{\pi}{2}} + \\ (S_{+1})^{-\frac{\pi}{2}}(I_{s_{+1}})^{-\frac{\pi}{2}} \end{array} \right\} - \left\{ \begin{array}{c} (S_{-1})^{+\frac{\pi}{2}}(I_{s_{-1}})^{+\frac{\pi}{2}} + \\ (S_{-1})^{-\frac{\pi}{2}}(I_{s_{-1}})^{-\frac{\pi}{2}} \end{array} \right\} + \delta \quad \text{(Equation 39)}$$

Under such conditions, first, a case where the diffraction grating 230 is disposed so that the phase distribution on the objective lens 300 becomes symmetrical in the radial direction of the optical disk 50 will be considered.

The ± first-order diffraction rays are reflection-diffracted by the optical disk 50 and are incident on the objective lens 300 so that, as shown in FIG. 10, the regions "S" have the relations expressed by (Equation 40).

$$(S_{+1})^{+\frac{\pi}{2}} = (S_{+1})^{-\frac{\pi}{2}} = (S_{-1})^{-\frac{\pi}{2}} = (S_{-1})^{+\frac{\pi}{2}} \equiv (S_{\pm 1})^{\pm \frac{\pi}{2}} \quad \text{(Equation 40)}$$

Therefore, when the equations (Equation 16) to (Equation 19) are used, the push-pull signal $PP_{sub}$ in the ± first-order diffraction rays is expressed by (Equation 41) on the basis of (Equation 40). In this case as well, the push-pull signal $PP_{sub}$ expressed by (Equation 41) does not depend on "v" but is an approximate value of "$\delta$".

$$PP_{sub} = (s_{\pm 1})^{\pm \frac{\pi}{2}}\left\{ \begin{array}{c} (I_{s_{+1}})^{+\frac{\pi}{2}} + (I_{s_{+1}})^{-\frac{\pi}{2}} - \\ (I_{s_{-1}})^{+\frac{\pi}{2}} - (I_{s_{-1}})^{-\frac{\pi}{2}} \end{array} \right\} + \delta = \quad \text{(Equation 41)}$$
$$2(s_{\pm 1})^{\pm \frac{\pi}{2}}\{\cos(\frac{\pi}{2} + A) + \cos(-\frac{\pi}{2} + A) -$$
$$\cos(\frac{\pi}{2} + B) - \cos(-\frac{\pi}{2} + B)\} + \delta = \delta$$

On the other hand, the phase distribution on the objective lens 300 is not always symmetrical in the radial direction of the optical disk 50. A case of disposing the diffraction grating 230 so that the phase distribution on the objective lens 300 shifts only by P/2 in the radial direction of the optical disk 50 will be considered.

Figure 15:
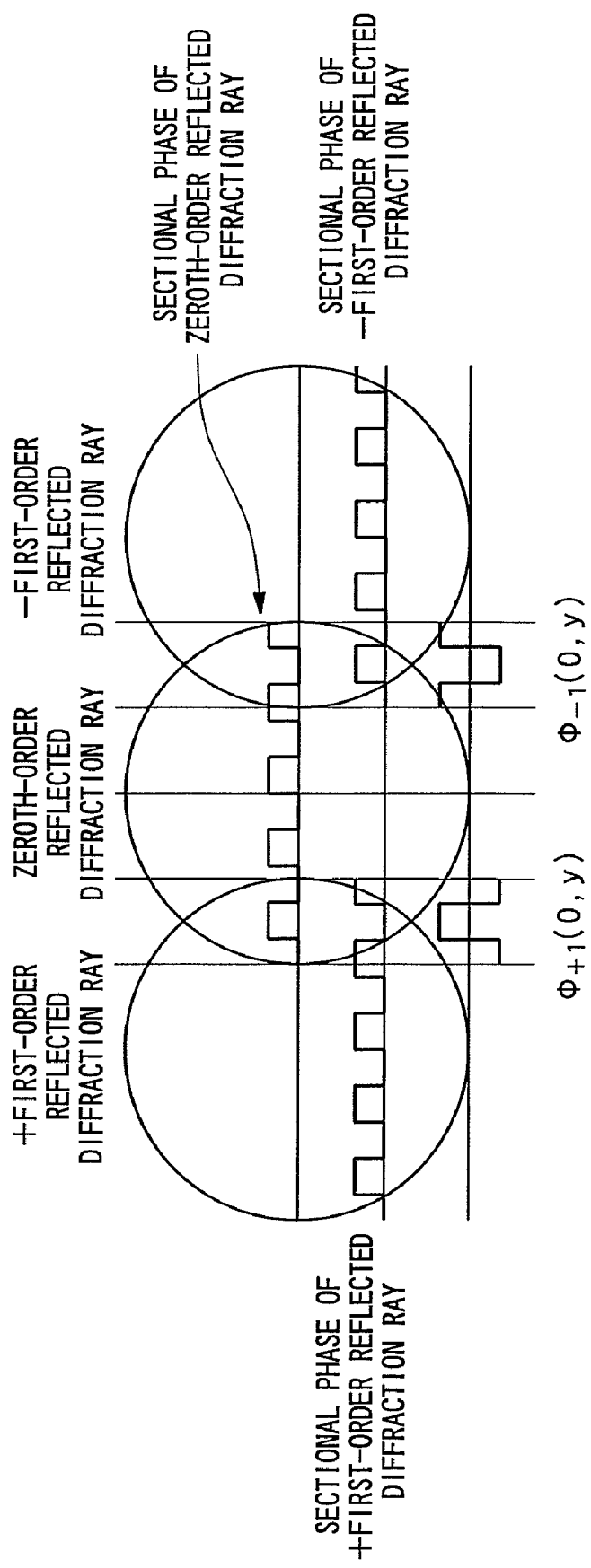
FIG. 15 is a diagram (IIX) for explaining the arrangement pitch P at which the first and second lattice grooves in the diffraction grating of the embodiment are arranged.

When the ± first-order diffraction rays are reflection-diffracted by the optical disk 50 and are incident on the objective lens 300 under such conditions, the phase distribution of the wave front of each of the diffraction-reflected diffraction rays shown in FIG. 15 is obtained. That is, as shown in FIG. 15, the regions "S" have the relations expressed by (Equation 42) and (Equation 43).

$$(S_{+1})^{+\frac{\pi}{2}} = (S_{-1})^{-\frac{\pi}{2}} \equiv (S_{\pm 1})^{\pm \frac{\pi}{2}} \quad \text{(Equation 42)}$$

$$(S_{+1})^{-\frac{\pi}{2}} = (S_{-1})^{+\frac{\pi}{2}} \equiv (S_{\pm 1})^{\mp \frac{\pi}{2}} \quad \text{(Equation 43)}$$

Therefore, using the equations (Equation 16) to (Equation 19), the push-pull signal $PP_{sub}$ in the ± first-order diffraction rays is expressed by (Equation 44) on the basis of (Equation 42).

$$PP_{sub} = (s_{\pm 1})^{\pm \frac{\pi}{2}}\left\{ \begin{array}{c} (I_{s_{+1}})^{+\frac{\pi}{2}} - \\ (I_{s_{-1}})^{-\frac{\pi}{2}} \end{array} \right\} + (s_{\pm 1})^{\mp \frac{\pi}{2}}\left\{ \begin{array}{c} (I_{s_{+1}})^{-\frac{\pi}{2}} - \\ (I_{s_{-1}})^{+\frac{\pi}{2}} \end{array} \right\} + \delta = \quad \text{(Equation 44)}$$

-continued $$\left\{\begin{array}{l}(S_{\pm 1})^{\pm\frac{\pi}{2}}-\\(S_{\pm 1})^{\mp\frac{\pi}{2}}\end{array}\right\}\sin H\sin\left(2\pi\frac{v}{TP}\right)+\delta$$

As understood from FIG. 15, the relation can be expressed by (Equation 45). Consequently, the push-pull signal $PP_{sub}$ expressed by (Equation 44) does not depend on "v" but becomes an approximate value of "δ".

$$(S_{\pm 1})^{\pm\frac{\pi}{2}}\approx(S_{\pm 1})^{\mp\frac{\pi}{2}} \qquad \text{(Equation 45)}$$

As described above, by shifting the groove cycles of the first and second lattice grooves 231 and 232 by "½" or "¼" and setting the arrangement pitch P of the first and second lattice grooves 231 and 232 as shown by (Equation 1) or (Equation 2), the push-pull signal $PP_{sub}$ in the ± first-order diffraction rays can be calculated as described above.

Namely, when the diffraction grating 230 of the embodiment is applied at the time of reproducing data in the optical disk 50 which is a BD-RE, also in the case of shifting the groove cycles of the first and second lattice grooves 231 and 232 in the diffraction grating 230 by "½", that is, giving a phase difference "π", or in the case of shifting the groove cycles by "¼", that is, giving a phase difference "π/2" as shown by the above equations (Equation 1) or (Equation 2), as shown in FIGS. 16 and 17, by setting "n=3" or larger, even if a positional shift of the diffraction grating 230, that is, a shift in adjustment of the x axis and the y axis in the objective lens 300 of the diffraction grating 230 occurs, the push-pull amplitude is suppressed.

Therefore, a push-pull offset is stored only by the ± first-order diffraction rays and, on the other hand, the push-pull signal amplitude is suppressed, that is, becomes almost zero. In the embodiment, by using such a diffraction grating 230 and the DPP tracking method in the optical pickup device 200, while cancelling the push-pull offset, fluctuations in the push-pull signal amplitude, that is, the tracking error signal amplitude can be reduced.

In the simulation results shown in FIGS. 16 and 17, the numerical aperture "NA=0.85" of the objective lens, the wavelength "λ=0.405 μm" of the light beam, the groove pitch "GP=0.32 μm", and the beam effective diameter "D=3.0 mm" are used, and lattice width W1 of the first lattice groove 231 and lattice width W2 of the second lattice groove 232 are the same. Each of FIGS. 16 and 17 is a graph showing the lattice groove width on the lateral axis and the normalized value of the push-pull amplitude on the vertical axis while changing the positional shift of the diffraction grating 230 normalized with a value 2W1 obtained by adding the lattice width W1 of the first lattice groove 231 and the lattice width W2 of the second lattice groove 232 every 5% from 0% to 25%.

The optical pickup device 200 of the embodiment is the optical pickup device 200 for emitting a light beam to the optical disk 50 to perform at least one of reading of data recorded on the optical disk 50 and recording of data to the optical disk 50, including: the light source unit 210 for emitting a light beam at the time of performing at least one of reading of data recorded on the optical disk 50 and recording of data to the optical disk 50; the diffraction grating 230 for diffracting the light beam emitted from the light source unit 210 to apply at least a zeroth-order diffraction ray, a + first-order diffraction ray, and a − first-order diffraction ray to the optical disk 50; the objective lens 300 for condensing the diffraction rays to the optical disk 50; the detector 270 for receiving the diffraction rays reflected from the optical disk 50 and outputting light reception signals; and the actuator 250 for controlling the position on the optical disk 50 of the objective lens 300 on the basis of the light reception signals. In the diffraction grating 230, when pitch of grooves formed in a surface of the optical disk 50 in the radial direction of the optical disk 50 is "GP", effective diameter of a light beam in the objective lens 300 is "D", wavelength of the light beam is "λ", and numerical aperture of the objective lens 300 is "NA", the first and second lattice grooves 231 and 232 are arranged at the pitch "P" satisfying (Equation 1), each of the first and second lattice grooves 231 and 232 has grooves formed in predetermined cycles in the track direction in which data is recorded on the optical disk 50, and the grooves in the track direction of one of the first and second lattice grooves are shifted from the cycles of grooves in the other lattice groove by ½.

With the configuration, the optical pickup device 200 of the embodiment emits the ± first-order diffraction rays generated by using the diffraction grating 230 of a special shape to the optical disk 50. At the time of detecting reflection-diffracted rays of the ± first-order diffraction rays by the detector 270, in regions where the zeroth-order reflected diffraction ray and ± first-order reflected diffraction rays interfere each other, the region where the light intensity is increased and the region where the light intensity is decreased become almost equal to each other. As a result, the push-pull signal amplitude becomes almost zero. Even when the relative positions of the objective lens 300 and the diffraction grating 230 of the special shape change, the ratio between the region where the light intensity is increased and the region where the light intensity is decreased in the reflected diffraction rays hardly changes.

As a result, in the optical pickup device 200 of the embodiment, by controlling the objective lens 300 via the actuator 250 by a differential push-pull signal, the position adjustment of the diffraction grating 230 becomes unnecessary at the time of assembly. While suppressing fluctuations in the differential push-pull signal amplitude caused by changes in the positions in the radial direction of the main beam and the sub-beams on the optical disk 50, a tracking error of the objective lens 300 which occurs according to a shift amount in the radial direction of the optical disk 50 of the objective lens 300 can be suppressed.

The optical pickup device 200 of the embodiment is the optical pickup device 200 for emitting a light beam to the optical disk 50 to perform at least one of reading of data recorded on the optical disk 50 and recording of data to the optical disk 50, including: the light source unit 210 for emitting a light beam at the time of performing at least one of reading of data recorded on the optical disk 50 and recording of data to the optical disk 50; the diffraction grating 230 for diffracting the light beam emitted from the light source unit 210 to apply at least a zeroth-order diffraction ray, a + first-order diffraction ray, and a − first-order diffraction ray to the optical disk 50; the objective lens 300 for condensing the diffraction rays to the optical disk 50; the detector 270 for receiving the diffraction rays reflected from the optical disk 50 and outputting light reception signals; and the actuator 250 for controlling the position on the optical disk 50 of the objective lens 300 on the basis of the light reception signals. In the diffraction grating 230, when pitch of grooves formed in a surface of the optical disk 50 in the radial direction of the optical disk 50 is "GP", effective diameter of a light beam in the objective lens 300 is "D", wavelength of the light beam is "λ", and numerical aperture of the objective lens 300 is "NA", the first and second lattice grooves 231 and 232 are arranged at the pitch P satisfying (Equation 2), each of the first and second lattice grooves 231 and 232 has grooves formed in predetermined cycles in the track direction in which data is recorded on the optical disk 50, and the grooves in the track direction of one of the first and second lattice grooves 231 and 232 are shifted from the cycles of grooves of the other lattice groove by ¼.

With the configuration, the optical pickup device 200 of the embodiment emits the ± first-order diffraction rays generated by using the diffraction grating 230 of a special shape to the optical disk 50. At the time of detecting reflection-diffracted rays of the ± first-order diffraction rays by the detector 270, in regions where the zeroth-order reflected diffraction ray and ± first-order reflected diffraction rays interfere each other, the region where the light intensity is increased and the region where the light intensity is decreased become almost equal to each other. As a result, the push-pull signal amplitude becomes almost zero. Even when the relative positions of the objective lens 300 and the diffraction grating 230 of the special shape change, the ratio between the region where the light intensity is increased and the region where the light intensity is decreased in the reflected diffraction rays hardly changes.

As a result, in the optical pickup device 200 of the embodiment, by controlling the objective lens 300 via the actuator 250 by a differential push-pull signal, the position adjustment of the diffraction grating 230 becomes unnecessary at the time of assembly. While suppressing fluctuations in the differential push-pull signal amplitude caused by changes in the positions in the radial direction of the main beam and the sub-beams on the optical disk 50, a tracking error of the objective lens 300 which occurs according to a shift amount in the radial direction of the optical disk 50 of the objective lens 300 can be suppressed.

Figure 18:
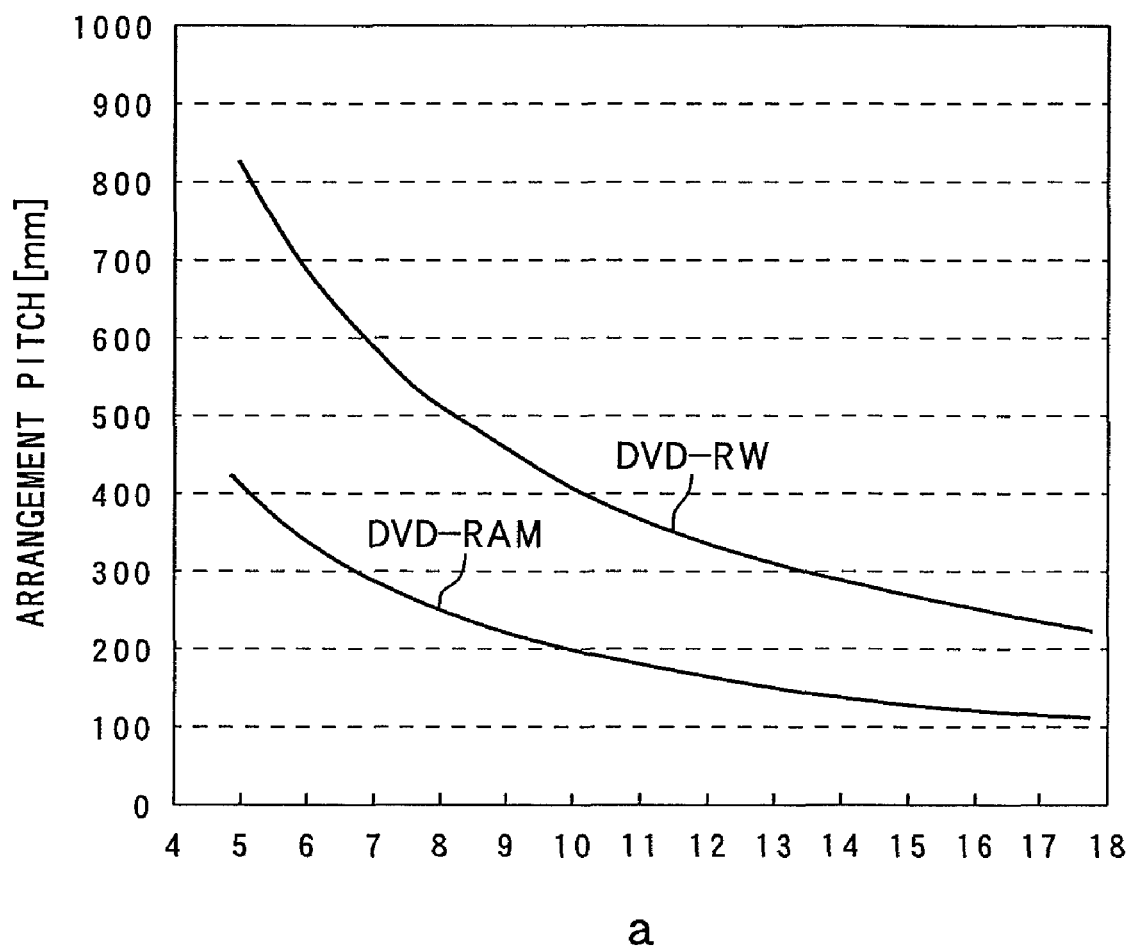
FIG. 18 is a graph showing the arrangement pitch "P" to "a" in a DVD-RAM and a DVD-RW.

The optical pickup device 200 of the embodiment can be also used at the time of recording/reproducing information to/from the optical disks 50 of different recording formats. For example, as shown in FIG. 18, when the arrangement pitch P is expressed by (Equation 46) on the basis of (Equation 1) and (Equation 2), by setting "a=9" for a DVD-RAM and by setting "a=17" for a DVD-RW, almost the same values can be used as the arrangement pitch P.

$$P = \frac{\lambda \cdot D}{a \cdot GP \cdot NA} \quad \text{(Equation 46)}$$

where a=(2n+1) or a=(4n+2) (n is natural number)

That is, by using the diffraction grating 230 having the values of the arrangement pitch P determined under conditions of different recording formats, the invention can be also applied to the optical disks 50 of different recording formats with the single diffraction grating 230. Although there is also a case such that the conditions are satisfied by increasing the value "a", for example, like setting "a=14" for a DVD-RAM and "a=28" for a DVD-RW, when the value "a" is increased, the arrangement pitch "P" inevitably becomes smaller, so that it is necessary to select "a" in consideration of manufacture accuracy of the diffraction grating. FIG. 18 is a graph showing the arrangement pitch "P" with respect to the values "a" in a DVD-RAM and a DVD-RW.

The invention claimed is:

1. An optical pickup device for emitting a light beam to an optical recording medium to perform at least one of reading of data recorded on the optical recording medium and recording of data to the optical recording medium, comprising:

a light source for emitting a light beam at the time of performing at least one of reading of data recorded on the optical recording medium and recording of data to the optical recording medium;

a diffraction grating for diffracting the light beam emitted from the light source to apply at least a zeroth-order diffraction ray, a + first-order diffraction ray, and a − first-order diffraction ray to the optical recording medium;

a light focusing device which focuses the diffraction rays to the optical recording medium;

a light receiving device which receives the diffraction rays reflected from the optical recording medium and outputs light modulated signals; and a control device which controls a position on the optical recording medium of the light focusing device on the basis of the light modulated signals, wherein in the diffraction grating, when pitch of grooves formed in a recording surface of the optical recording medium in the radial direction of the optical recording medium is GP, effective diameter of a light beam in the light focusing device is D, wavelength of the light beam is λ, numerical aperture is NA, and n is a natural number, first and second lattice grooves are arranged at the pitch P satisfying the following equation in a direction perpendicular to a track direction in which data is recorded in the optical recording medium, $$P = \frac{\lambda \cdot D}{(2n+1) \cdot GP \cdot NA} \quad \text{(Equation 1)}$$

each of the first and second lattice grooves has grooves formed in predetermined cycle in the track direction in which data is recorded on the optical recording medium, and the grooves in the track direction of one of the first and second lattice grooves are shifted from the grooves in the other lattice groove by ½ of the cycle.

2. An optical pickup device for emitting a light beam to an optical recording medium to perform at least one of reading of data recorded on the optical recording medium and recording of data to the optical recording medium, comprising:

a light source for emitting a light beam at the time of performing at least one of reading of data recorded on the optical recording medium and recording of data to the optical recording medium;

a diffraction grating for diffracting the light beam emitted from the light source to apply at least a zeroth-order diffraction ray, a + first-order diffraction ray, and a − first-order diffraction ray to the optical recording medium;

a light focusing device which focuses the diffraction rays to the optical recording medium;

a light receiving device which receives the diffraction rays reflected from the optical recording medium and outputs light modulated signals; and a control device which controls a position on the optical recording medium of the light focusing device on the basis of the light modulated signals, wherein in the diffraction grating, when pitch of grooves formed in a recording surface of the optical recording medium in the radial direction of the optical recording medium is GP, effective diameter of a light beam in the light focusing device is D, wavelength of the light beam is λ, numerical aperture is NA, and n is a natural number, first and second lattice grooves are arranged at the pitch P satisfying the following equation in a direction perpendicular to a track direction in which data is recorded in the optical recording medium, $$P = \frac{\lambda \cdot D}{(4n+2) \cdot GP \cdot NA} \quad \text{(Equation 2)}$$

each of the first and second lattice grooves has grooves formed in predetermined cycles in the track direction in which data is recorded on the optical recording medium, and the grooves in the track direction of one of the first and second lattice grooves are shifted from the grooves of the other lattice groove by ¼ of the cycle.

3. The optical pickup device according to claim 1, wherein the control device controls the position in the optical recording medium of the light focusing device on the basis of the light modulated signals by a differential push pull method.

4. The optical pickup device according to claim 1, wherein the diffraction grating is constructed by a liquid crystal panel.

* * * * *